(12) United States Patent
Rosenberg

(10) Patent No.: US 11,144,885 B2
(45) Date of Patent: Oct. 12, 2021

(54) USING CALENDAR INFORMATION TO AUTHORIZE USER ADMISSION TO ONLINE MEETINGS

(71) Applicant: Cisco Technology, Inc., San Jose, CA (US)

(72) Inventor: Jonathan Rosenberg, Freehold, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 185 days.

(21) Appl. No.: 15/205,622

(22) Filed: Jul. 8, 2016

(65) Prior Publication Data

US 2018/0012191 A1    Jan. 11, 2018

(51) Int. Cl.
*G06Q 10/10*       (2012.01)
*H04L 29/06*       (2006.01)
*H04L 29/08*       (2006.01)

(52) U.S. Cl.
CPC ....... *G06Q 10/1095* (2013.01); *H04L 65/403* (2013.01); *H04L 67/02* (2013.01); *H04L 67/141* (2013.01); *H04L 67/42* (2013.01)

(58) Field of Classification Search
CPC .................................................. G06Q 10/1095
See application file for complete search history.

(56) References Cited

U.S. PATENT DOCUMENTS

| | | | |
|---|---|---|---|
| 6,119,147 A | 9/2000 | Toomey et al. | |
| 7,664,490 B2 | 2/2010 | Aaby et al. | |
| 7,764,632 B2 | 7/2010 | Gray et al. | |
| 7,876,714 B2 | 1/2011 | Ethier et al. | |
| 8,045,489 B2 | 10/2011 | Lee et al. | |
| 8,200,756 B2 | 6/2012 | Kamiely | |
| 8,245,141 B1 | 8/2012 | Fuller et al. | |
| 8,286,183 B2 | 10/2012 | Baird et al. | |
| 8,319,816 B1 | 11/2012 | Swanson et al. | |
| 8,346,231 B1 | 1/2013 | Smith et al. | |
| 8,375,132 B2 | 2/2013 | Hernanz | |
| 8,402,091 B2 | 3/2013 | Kamiely | |
| 8,478,622 B2 | 7/2013 | Grodum | |
| 8,713,662 B2 | 4/2014 | Staurnes et al. | |
| 8,732,244 B2 | 5/2014 | Kamiely | |

(Continued)

FOREIGN PATENT DOCUMENTS

WO    2016/099809 A1    6/2016

OTHER PUBLICATIONS

L. Dusseault et al, Open calendar sharing and scheduling with CalDAV, IEEE Internet Computing (vol. 9, Issue: 2, Mar.-Apr. 2005), pp. 81-89 (Year: 2005).*

(Continued)

*Primary Examiner* — Andre D Boyce
(74) *Attorney, Agent, or Firm* — Edell, Shapiro & Finnan, LLC

(57) ABSTRACT

A meeting server receives from a client device a join request for a user to join a scheduled meeting. An identifier is obtained for the user based on the join request. Information for the meeting is accessed based on the join request, the information including a list of invitees for the meeting. The identifier for the user is compared with the list of invitees for the meeting. It is determined whether to connect the client device to the meeting based on the comparing.

22 Claims, 20 Drawing Sheets

(56) References Cited

U.S. PATENT DOCUMENTS

| | | | |
|---|---|---|---|
| 8,831,197 B2 | 9/2014 | Prabhune et al. | |
| 8,990,329 B1 | 3/2015 | Khvostichenko et al. | |
| 9,881,282 B1* | 1/2018 | Narayanaswamy | G06Q 10/1095 |
| 2004/0003040 A1* | 1/2004 | Beavers | H04N 7/15 709/204 |
| 2004/0199580 A1* | 10/2004 | Zhakov | H04L 12/1818 709/204 |
| 2005/0058088 A1 | 3/2005 | Decker et al. | |
| 2006/0182249 A1 | 8/2006 | Archamnault et al. | |
| 2007/0208806 A1 | 9/2007 | Mordecai et al. | |
| 2008/0049922 A1* | 2/2008 | Karniely | H04M 3/562 379/205.01 |
| 2008/0134343 A1 | 6/2008 | Pennington et al. | |
| 2008/0189619 A1* | 8/2008 | Reed | G06Q 10/109 715/751 |
| 2008/0240391 A1 | 10/2008 | Nishide | |
| 2009/0013045 A1 | 1/2009 | Maes et al. | |
| 2009/0094083 A1* | 4/2009 | Denner | G06Q 10/06 705/7.19 |
| 2009/0181659 A1* | 7/2009 | Stalnacke | G06Q 10/1093 455/416 |
| 2009/0287790 A1* | 11/2009 | Upton | H04L 12/1827 709/208 |
| 2010/0005142 A1* | 1/2010 | Xiao | G06Q 10/10 709/204 |
| 2010/0037151 A1* | 2/2010 | Ackerman | G06Q 10/10 715/753 |
| 2010/0223345 A1* | 9/2010 | Gupta | G06Q 10/109 709/206 |
| 2010/0302345 A1* | 12/2010 | Baldino | G06Q 10/10 348/14.08 |
| 2011/0154204 A1* | 6/2011 | Narayanaswamy | H04M 3/56 715/727 |
| 2011/0271332 A1 | 11/2011 | Jones et al. | |
| 2012/0011249 A1 | 1/2012 | Wong et al. | |
| 2012/0054836 A1 | 3/2012 | Chien et al. | |
| 2012/0179502 A1* | 7/2012 | Farooq | G06Q 10/06311 705/7.13 |
| 2012/0204120 A1* | 8/2012 | Lefar | G06Q 10/0631 715/757 |
| 2012/0314849 A1 | 12/2012 | LeBlanc et al. | |
| 2013/0018950 A1 | 1/2013 | Narayanan et al. | |
| 2013/0155169 A1* | 6/2013 | Hoover | H04N 7/157 348/14.02 |
| 2013/0263216 A1* | 10/2013 | Vakil | G06F 21/31 726/3 |
| 2014/0019536 A1* | 1/2014 | Christensen | G06Q 10/10 709/204 |
| 2014/0095871 A1 | 4/2014 | Hoard et al. | |
| 2014/0096266 A1 | 4/2014 | Hoard et al. | |
| 2014/0172967 A1* | 6/2014 | Yeung | H04L 65/403 709/204 |
| 2014/0173696 A1 | 6/2014 | Albouyeh et al. | |
| 2014/0189529 A1* | 7/2014 | Cole | G06Q 10/1095 715/753 |
| 2014/0310044 A1* | 10/2014 | Meltzer | G06Q 10/1095 705/7.19 |
| 2014/0362165 A1* | 12/2014 | Ackerman | H04L 65/4076 348/14.07 |
| 2015/0169069 A1* | 6/2015 | Lo | G06F 3/017 715/753 |
| 2015/0180821 A1* | 6/2015 | Shapiro | H04L 12/1818 709/206 |
| 2015/0304121 A1* | 10/2015 | Wu | H04L 12/1822 709/204 |
| 2015/0310438 A1 | 10/2015 | Kassemi et al. | |
| 2016/0021254 A1* | 1/2016 | Red | H04M 3/565 379/202.01 |
| 2016/0275952 A1* | 9/2016 | Kashtan | G10L 17/00 |
| 2016/0277242 A1* | 9/2016 | Sallam | H04L 41/0816 |

OTHER PUBLICATIONS

Olli Korjus, Meeting Scheduling Assistant: Automatic scheduling between heterogeneous calendar systems, Aalto University School of Science Degree Programme of Computer Science and Engineering, Master's Thesis, Sep. 27, 2012 (Year: 2012).*

Bowersox, "What is the architecture of a scalable URL shortener?", http://www.quora.com/What-is-the-architecture-of-a-scalable-URL-shortener, Aug. 2014, 3 pages.

B. Desruisseaux, "Internet Calendaring and Scheduling Core Object Specification (iCalendar)", IETF, Network Working Group, Category: Standards Track, Sep. 2009, 168 pages.

Stack Overflow, "How to code a URL shortener?", http://stackoverflow.com/questions/742013/how-to-code-a-url-shortener, Aug. 28, 2014, 9 pages.

International Search Report and Written Opinion in corresponding International Application No. PCT/US2017/040828, dated Sep. 7, 2017, 11 pages.

B. Desruisseaux, "Internet Calendaring and Scheduling Core Object Specification (iCalendar)", IETF, Network Working Group, Category: Standards Track, RFC 5545, Sep. 2009, 168 pages.

"Audio Controls Guide and Release Notes for FR29", Conferencing & Collaboration, User Guide, Cisco WebEx, Apr. 2012, 11 pages.

"WebEx Meeting Center User Guide", For Hosts, Presenters, and Participants, Cisco WebEx, www.webex.com, May 2, 2013, 414 pages.

International Search Report and Written Opinion in counterpart International Application No. PCT/US2016/028081, dated Jun. 22, 2016, 9 pages.

International Search Report and Written Opinion in corresponding International Application No. PCT/US2016/018597, dated May 23, 2016, 10 pages.

International Search Report and Written Opinion in corresponding International Application No. PCT/US2016/018594, dated May 25, 2016, 10 pages.

Gatekeeper Software Solutions, LLC, "PRIME Virtual Waiting Room", http://www.gatekeeperwebsolutions.com/prime-virtual-waiting-room, Retrieved Nov. 3, 2014, 3 Pages.

* cited by examiner

FIG. 5

HOST TELLS THE (REQUESTING)
PARTICIPANT TO JOIN THE MEETING

REMAINING MEETING 1
PARTICIPANTS HAVE LEFT

USING CALENDAR INFORMATION TO AUTHORIZE USER ADMISSION TO ONLINE MEETINGS

TECHNICAL FIELD

The present disclosure relates to managing online meetings.

BACKGROUND

A key issue for online/web-based meetings is how to manage admission control into a meeting. In other words, when an individual tries to join the online meeting, how does a host of the meeting know the individual is supposed to actually attend the meeting and, if the individual is supposed to attend the meeting, only then admit the individual? There can be undesirable consequences when individuals are admitted to the online meeting who are not supposed to be. These consequences include leakage of sensitive information to competitors, embarrassment to meeting participants, and so on.

Personal Meeting Rooms (PMRs) and Collaboration Meeting Rooms (CMRs) represent a common meeting concept in which a user of the meeting service "owns" a personal meeting link, e.g., a Uniform Resource Locator (URL), "go.meetingservicename.com/meet/ownername." To host a meeting, the user provides the URL to other users who simply click on the link to open a browser and connect to the meeting service to enter the owner's personal meeting. As long as the host of the meeting—the user who owns the URL for the personal meeting room—is in the meeting, other users can join the meeting. However, if the host is not present, other users may wait in a virtual "lobby" until the host joins. In this lobby, the guests are unable to communicate. This concept works for ad-hoc meetings and scheduled meetings, for which a user pastes the URL into a meeting invite. However, a meeting in a CMR/PMR can present certain challenges. For example, if the host is late to a meeting, other meeting participants must wait for the host to enter the room and cannot usefully begin the meeting. Also, if a user schedules back-to-back meetings in the same CMR/PMR, at a time of transition between meetings, new users may show up for the later meeting and incorrectly be connected into the room while the earlier meeting is in progress.

BRIEF DESCRIPTION OF THE DRAWINGS

FIG. 5 is a screen shot of an online meeting invitation to a personal meeting room (PMR) that is presented by a client device to a user, according to an example embodiment.

DESCRIPTION OF EXAMPLE EMBODIMENTS

Overview

In accordance with an embodiment, a meeting server receives from a client device a join request for a user to join a scheduled meeting. An identifier is obtained for the user based on the join request. Information for the meeting is accessed based on the join request, the information including a list of invitees for the meeting. The identifier for the user is compared with the list of invitees for the meeting. It is determined whether to connect the client device to the meeting based on the comparing. The meeting may be an online or web-based meeting.

Example Embodiments

Figure 1:
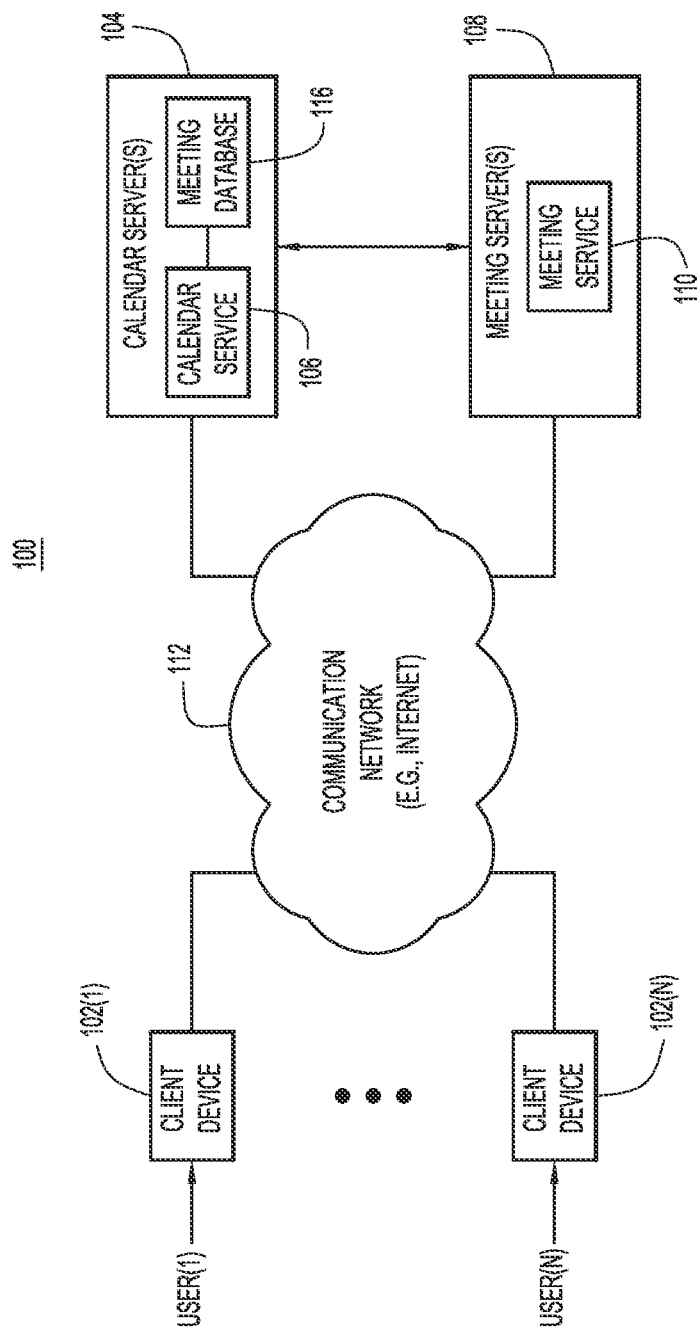
FIG. 1 is a diagram illustrating a network environment in which embodiments directed to online/web-based meetings present herein may be implemented, according to an example embodiment.

Referring first to FIG. 1, a diagram is shown of a network environment 100 in which embodiments directed to managing online meetings may be deployed. Environment 100 includes multiple user devices 102(1)-102(N) (also referred to as "client devices" 102(1)-102(N)) operated by respective users user(1)-user(N), a calendar server 104 to host a calendar service 106, a meeting server 108 to host a meeting service 110, and a communication network 112 over which the client devices, calendar service, and meeting service communicate. Network 112 may be any one or more of a wired or wireless local area network (LAN) and wired or wireless wide area network (WAN), including the Internet. Network 112 may support a variety of protocols, including without limitations, Session Initiation Protocol (SIP), Hypertext Transfer Protocol (HTTP), Real-time Transport Protocol (RTP). Calendar service 106 interacts with client devices 102(1)-102(N) to enable users of the client devices to schedule online meetings with each other, and the calendar service 106 also maintains a meeting database 116 of meeting information for all such scheduled online meetings. As an example, the calendar service 106 may be by embodied by a Microsoft Exchange® server or other similar calendar server software now known or hereinafter developed. Meeting service 110 accesses the meeting information maintained by calendar service 106 and uses that information to manage and provide resources for the meetings, such as a web-based meeting or a CMR/PMR meeting. The terms personal meeting room (PMR) and collaboration meeting room (CMR) are used interchangeably herein. In general, a web-based or online meeting is a meeting that is conducted over the Internet and managed by a meeting server (e.g., meeting server 108) that presents web-pages to each client device that is connected to the same meeting to mimic a collaborative environment in which users can converse in audio, video and electronically share documents and other data in real-time. A distinction may be drawn between the concept of an "online meeting" and the concept of a "PMR." An online meeting is a scheduled event with a given start time and a given end time based on a calendar, for example. The PMR is a place or web-environment in which an online meeting can take place; it has the property that users connected to or in the place are able to see and hear each other at the same time. An online meeting has a unique meeting identifier (ID), this can be considered an iCalendar (iCal) Universally Unique Identifier (UUID), or unique per instance of any scheduled meeting. A PMR is uniquely identified by its PMR Uniform Resource Identifier (URI) (e.g., jdoe@go.webex.com). Consequently, a first online meeting (meeting1) can be scheduled back-to-back with a second online meeting (meeting 2). Both can take place in the same PMR. There are two distinct meetings, and one distinct PMR. The terms "online" and "web-based" are synonymous and may be used interchangeably herein.

While FIG. 1 shows a single meeting server 108, it is to be understood that there may be multiple meeting servers distributed throughout a geographical area in order to support numerous web-based meetings between client devices. Moreover, there may be multiple instances of calendar server 104 for similar reasons.

Client devices 102(1)-102(N) may each take on a variety of forms, including a SmartPhone, tablet, laptop computer, desktop computer, video conference endpoint, and the like. Client devices 102(1)-102(N) may each run a calendar application and may also host a web conference client application that communicates with the calendar application. However, a video conference endpoint used to participate in a conference session does not have a calendar application running on it. Users of client devices 102(1)-102(N) may use the calendar applications to schedule online meetings into a user calendar at a date and time in the future. The calendar applications are capable of generating a meeting (i.e., generating a meeting appointment) and sending a meeting invitation to users, i.e., other client devices, as well as receiving a meeting invitation from other users. When a user accepts a meeting invitation, the calendar application stores information for the meeting. Calendar service 106 creates calendar events, e.g., online meetings, based on messages from client devices 102(1)-102(N), and then compiles that information into meeting records in meeting database 116. Meeting information compiled by calendar service 106 for a given online meeting may include all, or a subset of, the following items: a unique identifier for the meeting; an identifier of a host of the meeting; a list of invitees (i.e., invitee identifiers) to the meeting; and a start time and an end time of the meeting. The identifier of the host and each invitee identifier may each include one or more of a name and an email address, for example.

Client devices 102(1)-102(N) and calendar service 108 may use any number of available calendar and meeting scheduling tools to perform the operations mentioned above to schedule meetings and build meeting database 116, which is accessible to meeting service 110. In an example, operations to schedule a meeting into a calendar of user may be performed using the Microsoft Outlook® software application and Outlook plugins on client devices 102(1)-102(N), such as WebEx® productivity tools. Such tools automatically add meeting links into a calendar invite. Furthermore, these tools can communicate to the meeting service 110, information about a scheduled meeting, such as the start time, stop time, invitees, forwards, and so on. Alternatively, Hybrid calendar technologies implemented as part of meeting service 108 may also be used. Hybrid calendar technologies leverage server-side calendar integrations using calendaring application programming interfaces (APIs), such as Exchange Web Services (EWS) or Representational State Transfer (REST) APIs. Such server-side calendar integrations (e.g., implemented in calendar service 106) allow applications—such as the meetings service 110—to have full access to the calendars of users. This means the server-side calendar integrations have access to scheduled online meetings and, for each online meeting, email addresses of participants invited to the meeting, a list of attendees to whom an invitation to the online meeting was forwarded, a list of recipients of the forwarded invitation and who accepted and declined the forwarded invitation, and start and stop times of the meeting. Over time, as/if the invitee list of an online meeting changes as a result of any of the aforementioned acts, the server-side calendar integrations of meeting service 110 will be able to access updated meeting records in meeting database 116.

Server-side communication between the meeting service and calendar service is not required for purposes of the embodiments presented herein. For example, plugins in client applications may be used so that the client applications communicate to the meeting service in order to send calendar information to the meeting service.

Meeting service 110 communicates with the calendar service 106 using the above-mentioned calendar fusion technologies and related communication protocols in order to obtain access to information in the meeting database 116 for controlling admittance of a client device (user) to a web-based meeting, in accordance with the embodiments described herein. Thus, the meeting service 110 may query the meeting database 116 at the time a decision is to be made by the meeting service 110 to admit a user to a meeting, or it may be in communication with the meeting database 116 on a periodic basis, or may maintain a mirror copy of the content of the meeting database 116, updated as needed, such as when there are changes.

Figure 2:
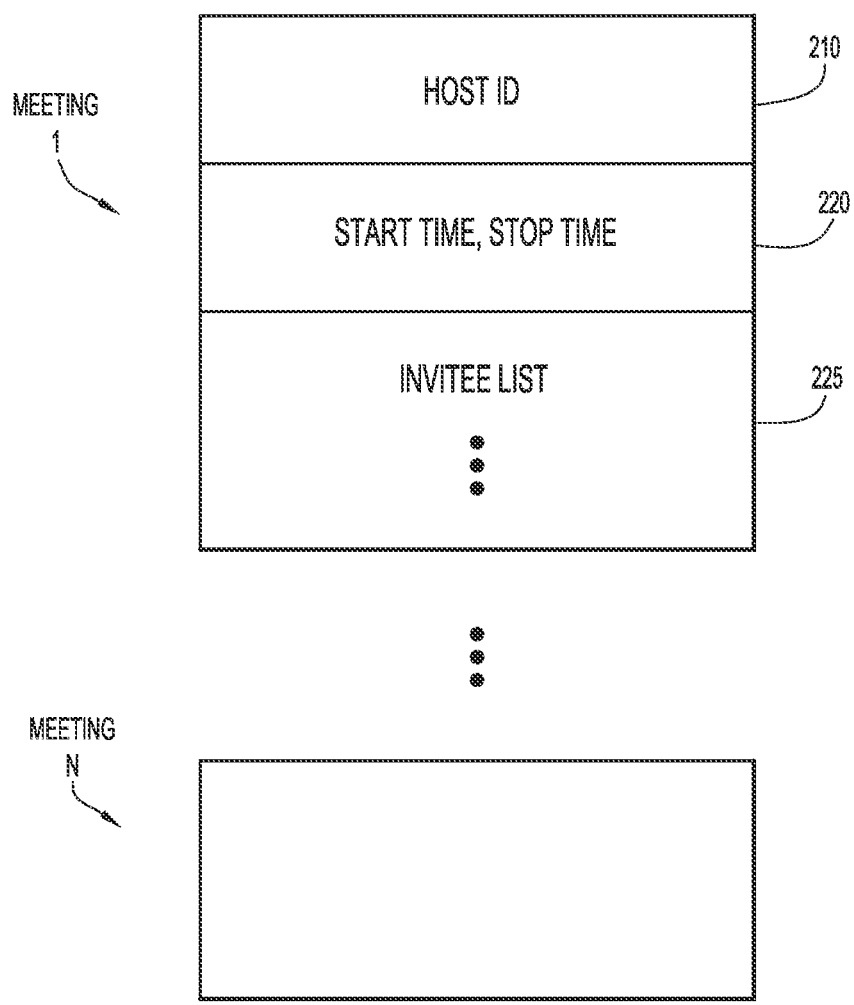
FIG. 2 is an illustration of an example of meeting database of online meeting records used to assist with managing admittance to online meetings, according to an example embodiment.

With reference to FIG. 2, there is an illustration of an example of meeting database 116. Meeting database 116 includes meeting records meeting1-meetingN each for a corresponding one of N scheduled online meetings. Calendar service 108 compiles meeting records meeting1-meetingN as described above and shares the records with meeting service 110 as needed for the methods described below. In other examples, portions of meeting database 116, including a subset of meeting records meeting1-meetingN, may be stored on meeting server 108 so as to be local to meeting service 110.

Meeting record meeting1 may take different forms depending on the type of meeting resource to which the online meeting applies, such as a PMR/CMR, WebEx® meeting, and so on. Meeting record meeting1 may include a host ID 210 of the host of the meeting, such as a hostname and a host email address, start and stop times 220, and a list of invitees (i.e., a list of participants invited to the meeting) 225. The list of invitees 225 may include identifiers of each invitee, e.g., a name and an email address of each invitee. The other meeting records may include information similar to record meeting1, or a subset of that information particular to the respective meeting represented by the meeting record. Similarly, meeting1 may be a recurring meeting in which case start-time and stop-time 220 may include multiple times. Alternatively, meeting1 may be a single instance of a recurring meeting.

Admission Control for Online Meetings

As mentioned above, a key issue for online meetings is how to manage admission control into a meeting. There are many conventional solutions for this, all of which have disadvantages, as described briefly below for conventional solutions #1-#4.

Solution #1: Private meeting links. This is a solution provided by a meeting service, such as the WebEx® meeting service, for example. When an online meeting is scheduled, each online meeting has an associated long, random, meeting (join) link (e.g., URL) that is not guessable. The random meeting link is embedded in an invite to the meeting (i.e., a meeting invite). Participants on the meeting invite are able to view the random link in the calendar applications running on their respective client devices. Clicking on the random link directs the client device to the online meeting. A drawback is that meeting invites—especially as meeting sizes get larger—are easily forwarded, e.g., via email, and thus the actual set of participants able to view the random link is difficult to control.

Solution #2: Meeting passwords. Similar to solution #1, the meeting invite includes a password and a hard-to-guess meeting identifier which must be entered by a participant at his/her corresponding client device. Since the password and meeting identifiers are in the same calendar invite as the meeting (join) link in Solution #1, Solution #2 has the same drawback as Solution #1, i.e., the invite can be forwarded easily such that control over who is able to join the online meeting is lost.

Solution #3: Voice prompts. When a participant joins a meeting with audio, the participant must speak his/her name. The attendees name is then played into an audio feed for the online meeting for all to hear. If the participant is not supposed to be in the meeting, the host can then eject that individual after the fact. This solution has many drawbacks, the most significant of which is that the audio prompts are highly disruptive to meeting attendees. Plus, a malicious attendee can attempt to sound like someone who is supposed to be in the online meeting.

Solution #4: Require authentication. A meeting service, such as WebEx, may have a feature wherein a host can require meeting participants to authenticate on their own sites. This at least prohibits attendance by attendees not on the WebEx® site of the host. This solution, as a result, has a side-effect authorization decision of "only provisioned members of this site may attend." While this solution may help cases where the goal is to prohibit employees outside of a company from joining because the non-employees will not be provisioned on the site; however the solution has drawbacks. For example, the solution does not work for meetings that include individuals outside of the company. Nor does it work for larger companies where an authorization policy needs to be more fine-grained than simply "only people in my company can join." The solution may also include a login step to join a meeting, which can be annoying to a user who has to perform this step. It also requires a dedicated meeting link (see solution #1 above) for which authentication is required.

Embodiments presented herein are directed to methods of authorizing meeting attendance to an online meeting. The methods, described below in connection with FIGS. 3 and 4, assume that the online meeting has already been scheduled by a host and one or more invitees to the online meeting have invitations thereto stored in the calendar applications of their respective client devices. When viewed at the client device, each invitation displays a clickable join link that, when selected/clicked by the user of the client device, causes the client device to send to server 108 a join request for the user to join the online meeting, whereby the client device is connected to the meeting by the meeting server. The join link may be a unique per-meeting link or a personal link such as those used for PMR or CMR meetings. Unique per-meeting links are unique to and identify a single web-based meeting. In the context of FIG. 2, a unique per-meeting link indicates only one of the meeting records in meeting database 116. In contrast, personal links (also referred to as "PMR links") may each indicate multiple web-based meetings in a PMR. Respective PMR links are assigned to registered users (i.e., "owners" of the assigned PMR links) of a given meeting service (e.g., meeting service 110). The registered users and unregistered users of the meeting service use the PMR links to access web-based meetings in the associated PMR. At a particular instant in time, each PMR link indicates all of the web-based meetings the owner of the PMR link is scheduled to attend which are occurring at that time, which may include zero, one, or more web-based meetings. In the context of FIG. 2, a given PMR link associated with a given user/owner of the PMR link may indicate/map to zero, one, or more than one of the meeting records of meeting database 116 for the given user/owner. The methods of FIGS. 3 and 4 also assume that meeting service 110 has access to the meeting records, e.g., from meeting database 116, that include the online meeting of interest. These methods may be initiated when a time of an online meeting arrives and a user of a client device clicks on the join link in the invitation causing his/her client device to send to meeting service 110 a join request for the user to join the online meeting.

Figure 3:
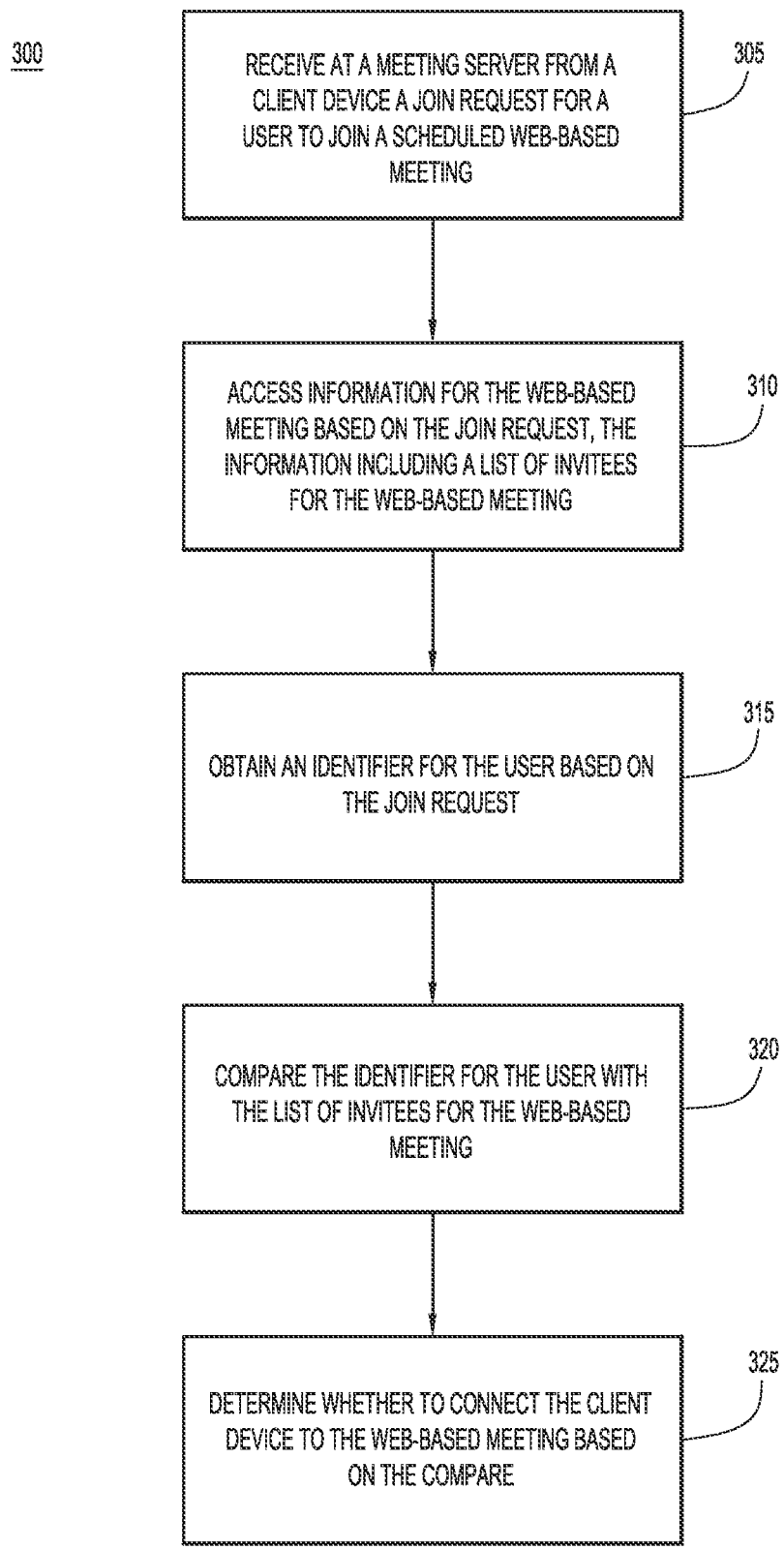
FIG. 3 is a flowchart of a high-level method of authorizing user attendance of an online meeting performed at a meeting service in the environment of FIG. 1, according to an example embodiment.

With reference to FIG. 3, there is a flowchart of an example high-level method 300 of authorizing attendance to an online meeting performed by meeting service 110.

At 305, meeting service 110 receives from the client device the join request for the user to join the online meeting.

At 310, meeting service 110 accesses information for the online meeting based on the join request. For example, meeting service 110 accesses information in meeting records from meeting database 116 based on the join request. The accessed information includes at least a list of invitees to the online meeting. The list of invitees may include identifiers of the invitees in the form of a name and an email address, for example. In an example in which the join request includes a unique per-meeting link that identifies an online meeting in meeting database 116, the accessed information includes the invitees to that online meeting. In an example in which the join request includes a PMR link, the PMR link may indicate any of zero or one or more online meetings in the PMR in meeting database 116. In a case where the PMR link indicates zero online meetings, there is no online meeting in the PMR, so a default "ad-hoc" mode for initiating an online meeting in the PMR ensues. On the other hand, in a case where the PMR link indicates one or more online meetings in the PMR, the accessed information includes the invitees to all of the one or more online meetings.

At 315, meeting service 110 obtains an identifier for the user, e.g., an email address of the user, based on the join request.

At 320, meeting service 110 compares the identifier for the user with the list of invitees, e.g., to email addresses of the invitees. In the case in which a PMR link in the join request indicates one or more online meetings, meeting service 110 compares the identifier for the user with the invitees to all of the one or more online meetings.

At 325, meeting service 110 determines whether to connect the client device to an online meeting based on the comparison operation 320. For example, if the comparison operation 320 indicates the identifier for the user is on the list of invitees for the meeting, meeting service 110 connects the client device to the online meeting. In the case in which a PMR link in the join request indicates one or more online meetings in the PMR and the identifier for the user is on the list of invitees of any of those online meetings, meeting service 110 connects the client device to the PMR. If the comparison operation 320 indicates the identifier for the user is not on the list of invitees, meeting service 110 does not connect the client device to the meeting.

Figure 4:
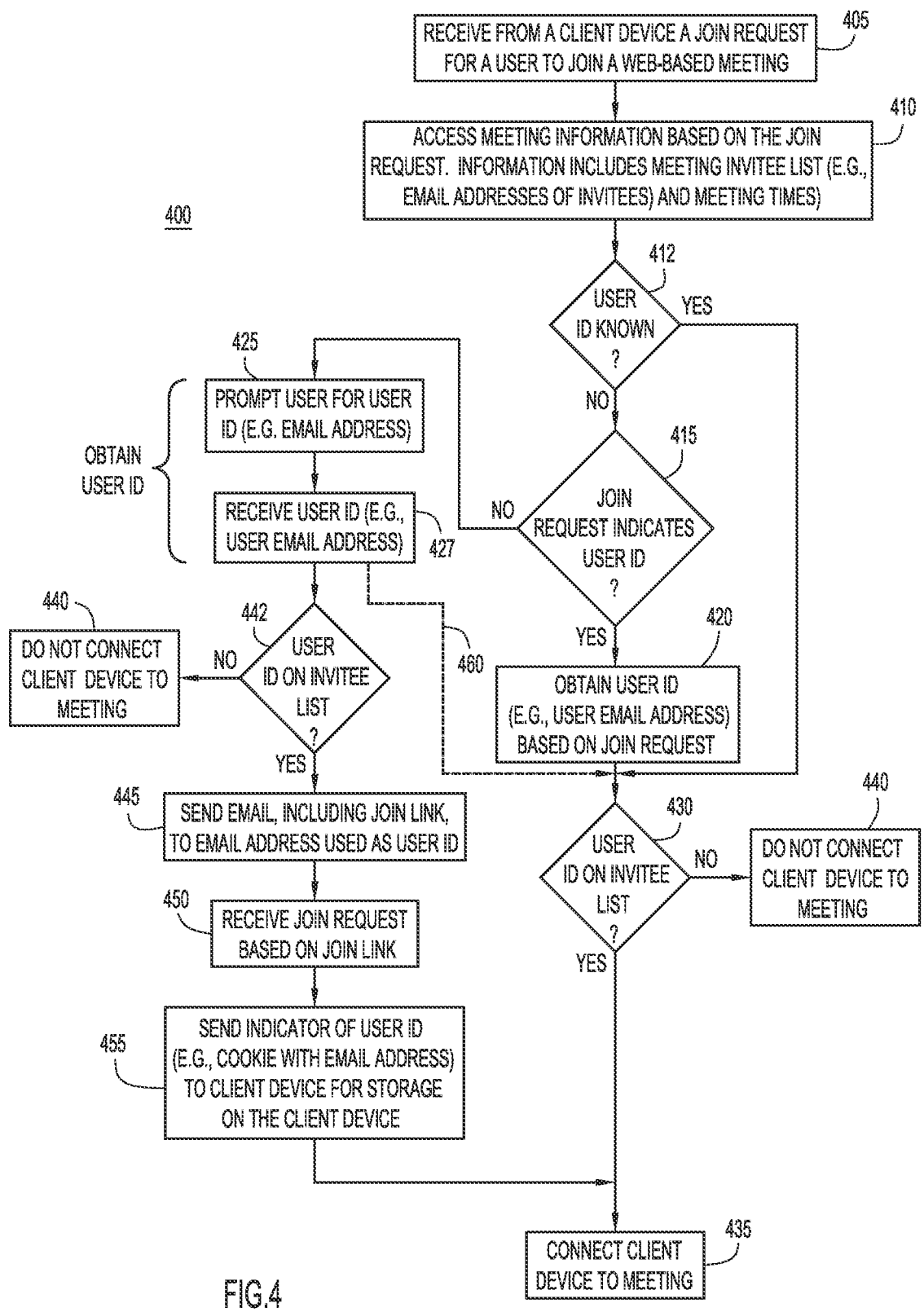
FIG. 4 is a more detailed flowchart that expands on the method of FIG. 3, according to an example embodiment.

With reference to FIG. 4, there is a flowchart of a more detailed method 400 that expands on the operations of method 300 described above. Reference is also made to FIG. 1 for purposes of this description.

At 405, meeting service 110 receives from the client device the join request for the user to join the online meeting (similar to operation 305). The join request may be generated from the user clicking on a join link used to join the online meeting.

At 410, meeting service 110 accesses information for the online meeting, including a list of invitees to the online meeting, based on the join request. To do this, meeting service 110 uses the join link or other meeting identifier included in the join request received at 405 as an index to retrieve one or more meeting records from meeting database 116. In a case where the join link includes a unique identifier for the online meeting, meeting service 110 retrieves only one meeting record based on the join link, and the list of invitees is available in that meeting record. On the other hand, if the join link is a URL for a PMR, for example, meeting service 110 may retrieve meeting records for multiple online meetings based on the URL. In that case, meeting service 110 determines which of the multiple online meetings match a current time, i.e., includes respective start and stop times that match the current time. The current time may be the time at which the join request was received at 405, for example. Meeting service 110 retrieves the list of invitees from the online meeting (or multiple online meetings) that both matches the URL and includes start and stop times that match the current time. In an example, the start and stop times of an online meeting are considered to match the current time (and thus the online meeting is considered to match the current time) if the current time is (i) within a first predetermined period (e.g., 5 minutes) before the start time, (ii) within a second predetermined period (e.g., 5 minutes) after the end time, or (iii) between the start and stop times, inclusively. Thus, back-to-back first and second online meetings both match a current time that is within 5 minutes before the second meeting because the current time is between the start and end times of the first meeting and within the 5 minute period prior to the second meeting.

At operations 412-427 described below, meeting service 110 obtains an identifier of the user (also referred to as a "user identifier"), such as an email address of the user.

At 412, meeting service 110 determines whether the user identifier is currently known to the meeting service. For example, if the user is a registered user with the meeting service 110 and is currently logged into the meeting service, the meeting service has a priori knowledge of the user identifier (e.g., the email address of the logged-in user). If it is determined at 412 that the user is a registered user, then the flow proceeds to 430. Otherwise, meeting service 110 does not know the user identifier, and flow proceeds to 415.

At 415, meeting service 110 determines whether the join request includes an indicator of the user identifier. The indicator may be, for example, a cookie that the meeting service 110 has previously assigned to this particular user. The cookie would have been previously stored on the client device that sent the join request received at 405. If the join request indicates the user identifier (i.e., has a cookie that the meeting service 110 recognizes), the user identifier is considered to be a verified or a validated user identifier based on previous meetings that the user may have attended with the meeting service 110. If the join request includes the indicator, flow proceeds to 420, otherwise flow proceeds to 425.

At 420, meeting service 110 obtains the user identifier based on the join request, e.g., from the cookie carried by the join request. In other words, the meeting service 110 uses the cookie included with the join request to retrieve the user identifier that it previously associated with that cookie.

At 430, meeting service 110 determines whether the user identifier is on the invitee list. If the user identifier is on the invitee list, at 435 meeting service 110 connects the client device to the online meeting, i.e., the user is admitted to the online meeting. If the user identifier is not on the invitee list, at 440 meeting service 110 does not connect the client device to the online meeting, i.e., the user is not admitted to the online meeting.

At 425 (the join request does not include the indicator of the user identifier), meeting service 110 sends a message, e.g., a webpage or update thereto, to the client device to cause the client device to prompt the user of the client device to enter a user name and a user identifier (e.g., an email address). Responsive to the prompt, the user enters the user name and the user identifier at the client device, and the client device sends a message including the entered information back to meeting service 110.

At 427, meeting service 110 receives the user name and the user identifier.

At 442, meeting service 110 determines whether the user identifier received at 427 is on the invitee list. If not, at 440 meeting service 110 does not connect the client device to the online meeting and the process ends. On the other hand, if the user identifier is on the invitee list, flow proceeds to 445. Next, operations 445, 450, and 455 are email address verification operations, i.e., operations that verify the email address received at operation 427.

At 445, meeting service 110 sends a webpage to the client device informing the user that an email message has been sent to the email address representative of the user identifier received at 430 and instructing the user to open the email and click on a "join meeting" link in the email to join the online meeting. Meeting service 110 also sends the email message referenced in the webpage to the aforementioned email address. The email message includes a clickable, unique, join link (e.g., URL) to the online meeting. This operation is referred to as forward email verification.

At 450, when the user at the client device receives and opens the email message sent to the email address at 445, and the user clicks on the join link in the email message, this causes the client device to send a join request to meeting service 110.

At 455, responsive to receiving (at 450) the join request to the online meeting, meeting service 110 sends an indicator of the user identifier to the client device for storage of the indicator at the client device, e.g., in a browser running on the client device, for future use. As described above, the indicator is a cookie that includes the user identifier for storage at the client device. The purpose of having the client device store the indicator of the user identifier, e.g., the cookie that is associated with the email address of the user, is so that a next time the user joins an online meeting via the client device, the client device is connected directly to the online meeting if the user is on the invitee list. In other words, the cookie contains or is associated with the email address of the user for future reference, avoiding the need for forward email verification, again. See, for example, operations 415 and 420 described above.

Flow proceeds from 455 to 435, where meeting service 110 connects the client device to the online meeting.

In another embodiment, the email address received at operation 427 is assumed valid and thus need not be verified. In this embodiment, flow proceeds from operation 427 directly to operation 430, thereby bypassing email verification (as indicated by alternative flow path 460 in FIG. 4).

Using methods 300 and 400, flexible authorization policies are possible for users to whom the online meeting invite was forwarded. For example, meeting service 110 may reject all such users, or it may place the users in an online lobby and then ask the meeting host if he/she would like to admit the users to the meeting. Other options are possible.

Figure 5:
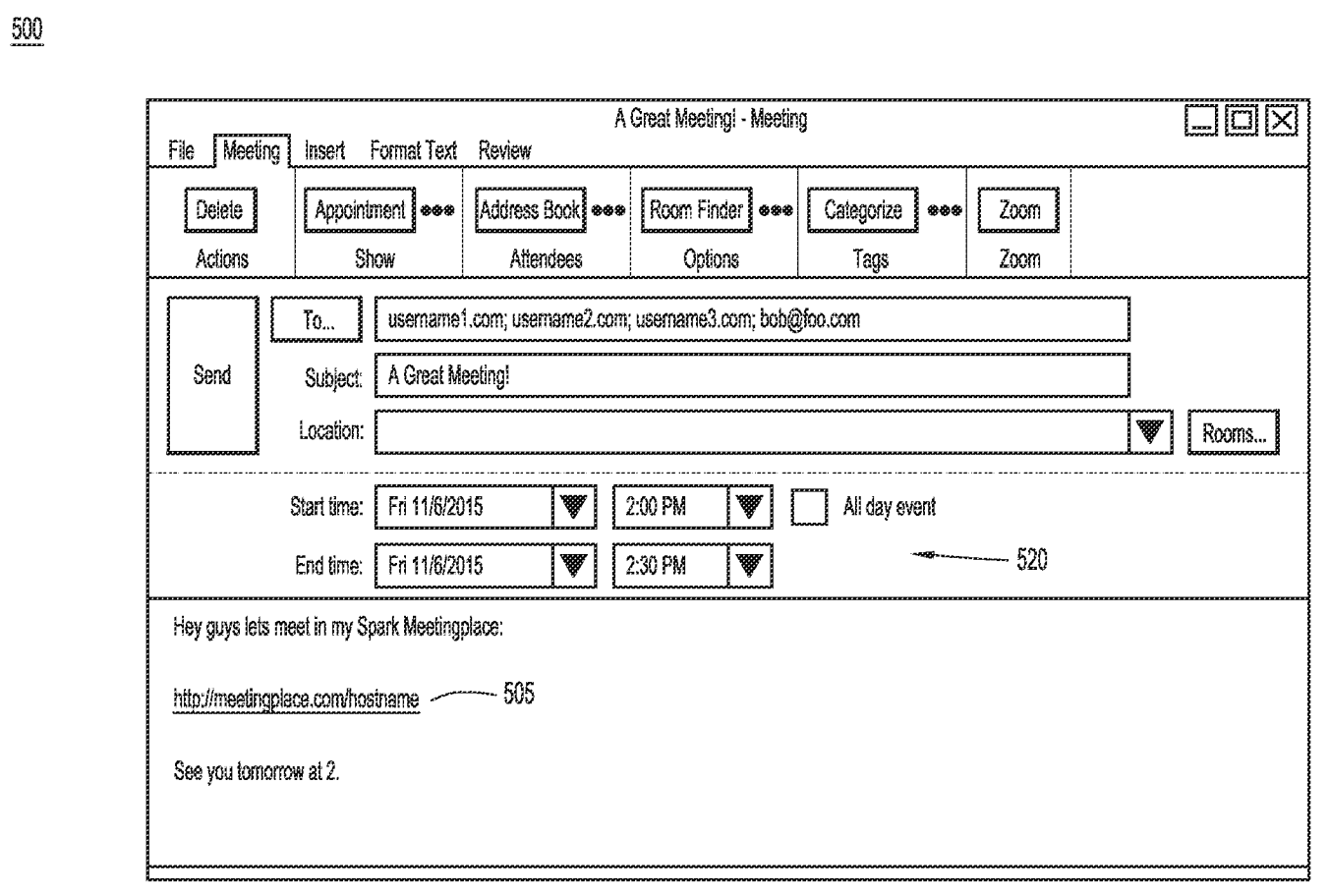

With reference to FIG. 5, there is shown a screen shot of an example online meeting invitation 500 to a meeting in a PMR that is presented by a client device to a user prior to operations 305/405. Invitation 500 includes a personal URL "http://meetingplace.ciscospark.com/hostname" 505 owned by "hostname" that, when clicked, causes the client device to send to meeting service 110 a join request for a user to join a meeting in the PMR identified by "hostname." The invitee list includes user identifiers 510, e.g., email addresses, for username1-username3, and bob@foo.com. The example of FIG. 5 shows a personal URL for an online meeting in a PMR. It is to be understood that such a personal URL may be replaced with a unique meeting URL or other meeting identifiers suitable for joining other types of online meetings.

Figure 6:
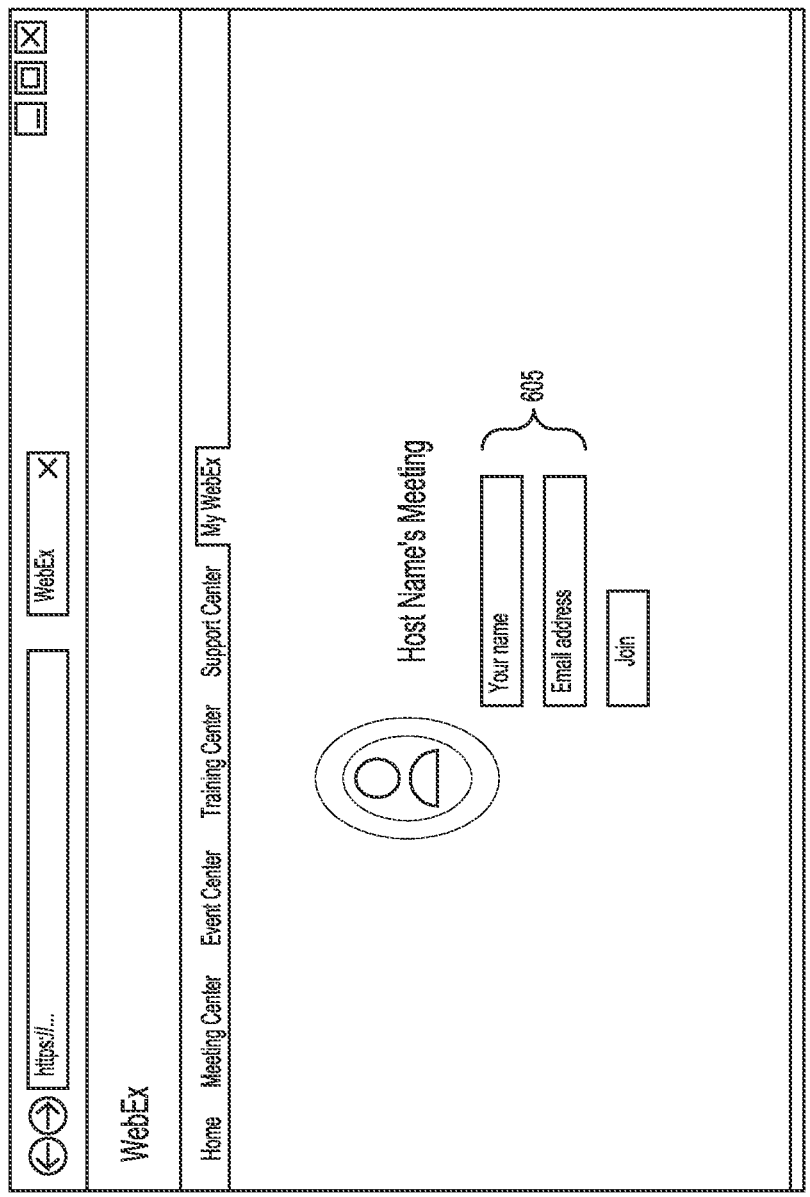
FIG. 6 is a screen shot of a webpage prompt sent by the meeting service to the client device to prompt the user to enter a username and a user identifier, according to an example embodiment.

With reference to FIG. 6, there is shown a screen shot of an example webpage 600 sent by meeting service 110 to a client device at operation 425, as presented by the client device to a user, to prompt the user (at shown at reference numeral 605) to enter user identifiers, e.g., a username and an email address of the user. Once the user has entered the username and user identifier, e.g., email address, the user clicks the "Join" button, which causes the client device to send a message including the entered information to meeting service 110.

Figure 7:
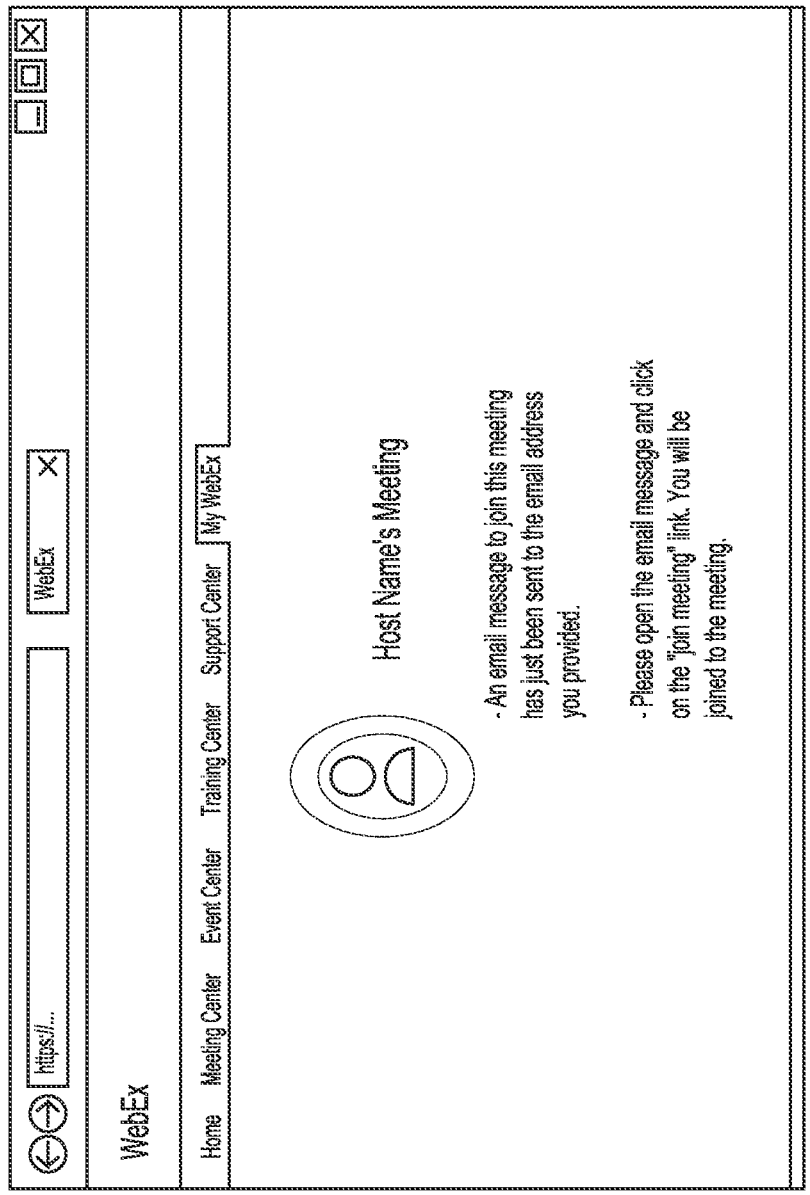
FIG. 7 is a screen shot of a webpage sent from the meeting service to the client device to inform a user that an email message has been sent to the user, and to instruct the user to open the email message and click on a "join meeting" link in the email to join an online meeting, according to an example embodiment.

With reference to FIG. 7, there is a screen shot of an example webpage 700 sent from meeting service 110 to the client device at operation 445, as presented by the client device, to inform a user that an email message has been sent to an email address received at operation 430 (via webpage 600) and instructing the user to open the email and click on a "join meeting" link in the email to join the online meeting.

Figure 8:
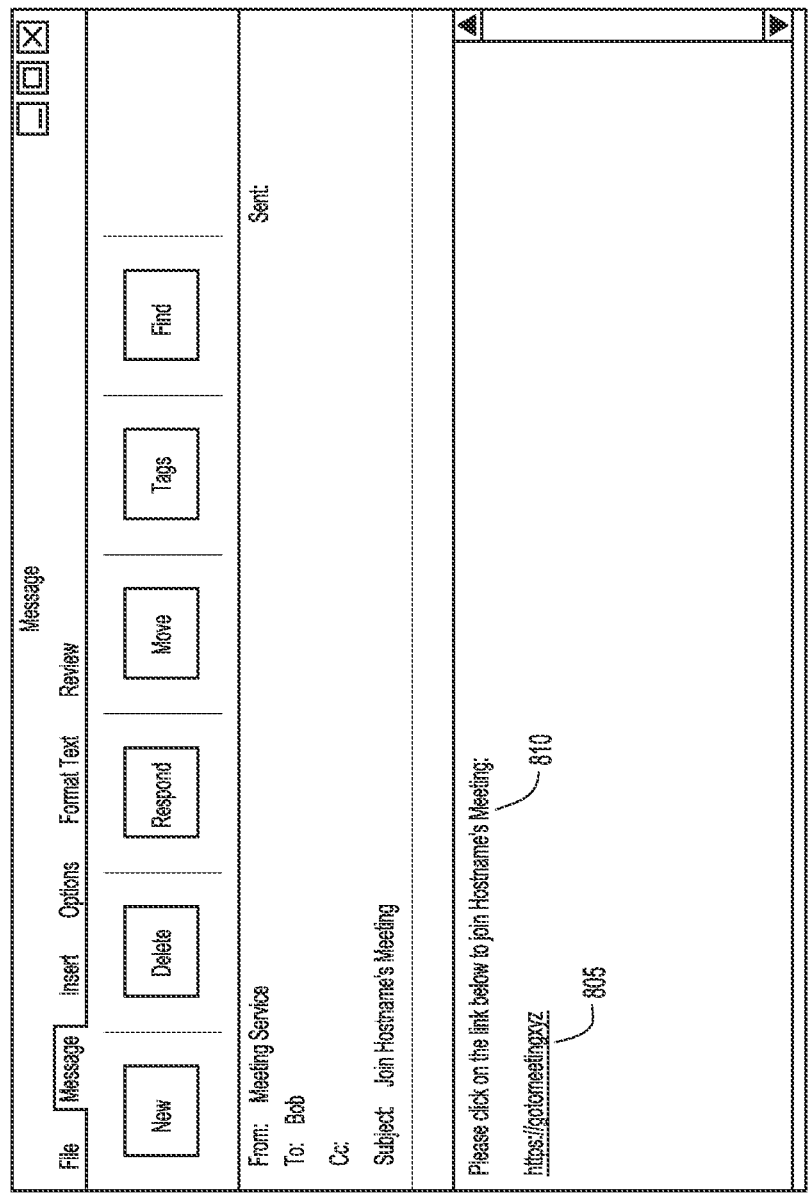
FIG. 8 is a screen shot of an email sent from the meeting service to a user email address in connection with the webpage of FIG. 7, according to an example embodiment.

With reference to FIG. 8, there is a screen shot of an example email 800 (shown in its opened form) sent from meeting service 110 to the email address bob@foo.com (from meeting invitation 500) approximately concurrently with webpage 700. Email 800 includes a join link 805 "https://gotomeetingxyz" that, when clicked, causes the client device to send a join request including the join link to meeting service 110. Email 800 also instructs (at 810) a user to click that link.

Figure 9:
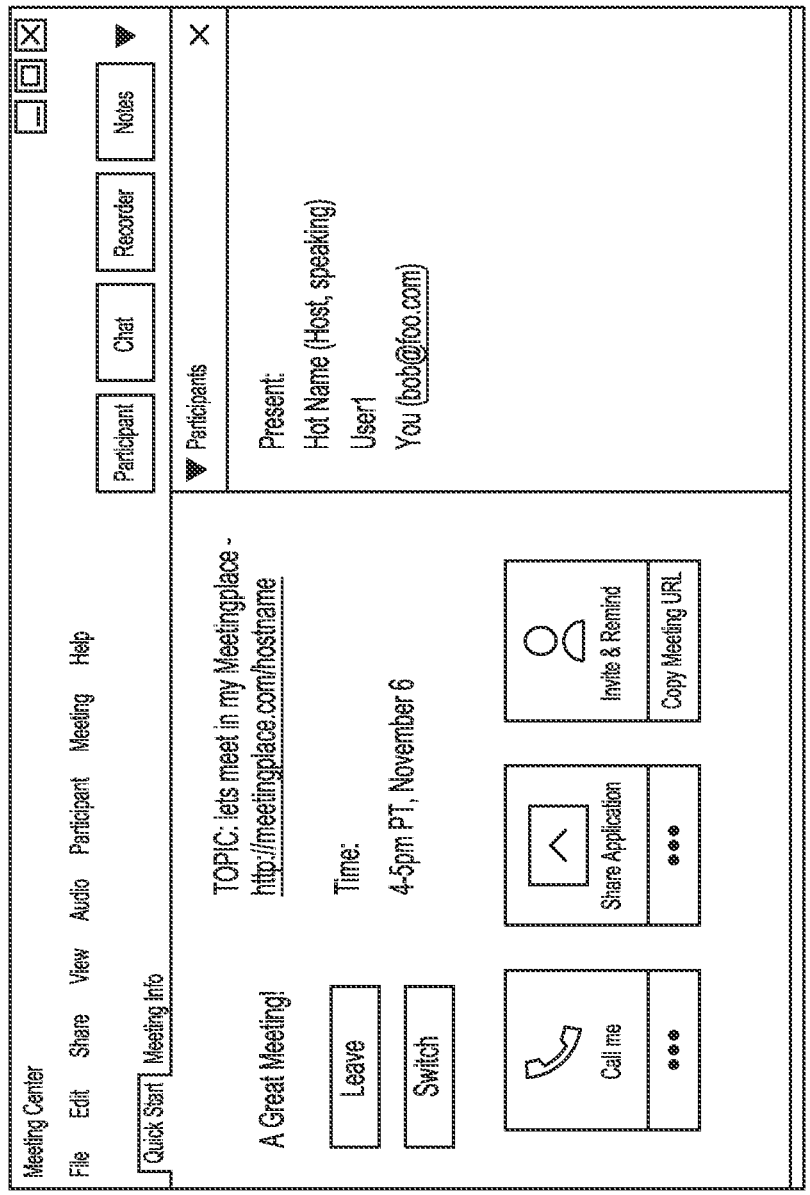
FIG. 9 is a screen shot of a webpage sent by the meeting service to the client device and that indicates the client device is connected to an online meeting, according to an example embodiment.

With reference to FIG. 9, there is shown a screen shot of an example webpage 900 sent by meeting service 110 to a client device at connect operation 435, that indicates the client device is connected to the online meeting indicated in webpage 500 shown in FIG. 5.

Improving PMR/CMR Meeting Experiences

PMRs and CMRs represent a common online meeting concept in which a user of the meeting service owns a personal meeting room URL, examples of which are described above. To host an online meeting, the user provides the URL to other users who simply click on the link from a browser to join the online meeting. As long as the host of the online meeting—the user who owns the URL—is in the meeting, other users can join the meeting. Conventional CMR/PMR online meetings have drawbacks, including, for example, the way in which back-to-back online meetings are handled. If a user schedules back-to-back online meetings in the same CMR/PMR, at a time of transition between meetings, new users may show up for the later meeting and incorrectly land in the earlier meeting. This can be avoided if the host manually locks the meeting room; however, this locking operation requires a manual step and puts a burden on hosts to lock and then unlock rooms as meeting participation shifts. Due to the guessability of the URL—it is persistent and purposefully mnemonic—it is easy for uninvited participants to join an online meeting. Consider a busy user who has back-to-back meetings all day in his/her CMR/PMR. A malicious user can keep trying to join online meetings in the CMR/PMR via a URL that is easily guessed, and at some point the odds are good there will be a meeting the host forgot to lock, and the malicious user may enter. If the host leaves the online meeting or drops-out of the meeting because of a user error or a disruption in connectivity, the meeting ends for everyone, unintentionally, which causes a disruption in the meeting experience.

Accordingly, embodiments presented herein are directed to methods of improving CMR/PMR (referred to simply as "PMR") experiences, especially in connection with back-to-back online meetings. The methods, described below in connection with FIGS. 10 and 11, assume that one or more online meetings in a PMR/CMR of a host have already been scheduled by a host and invitees to the one or more online meetings have invitations thereto stored in the calendar applications of their respective client devices. The invitations include a personal URL of the host used for joining the online meetings in the CMR/PMR of the host.

Figure 10:
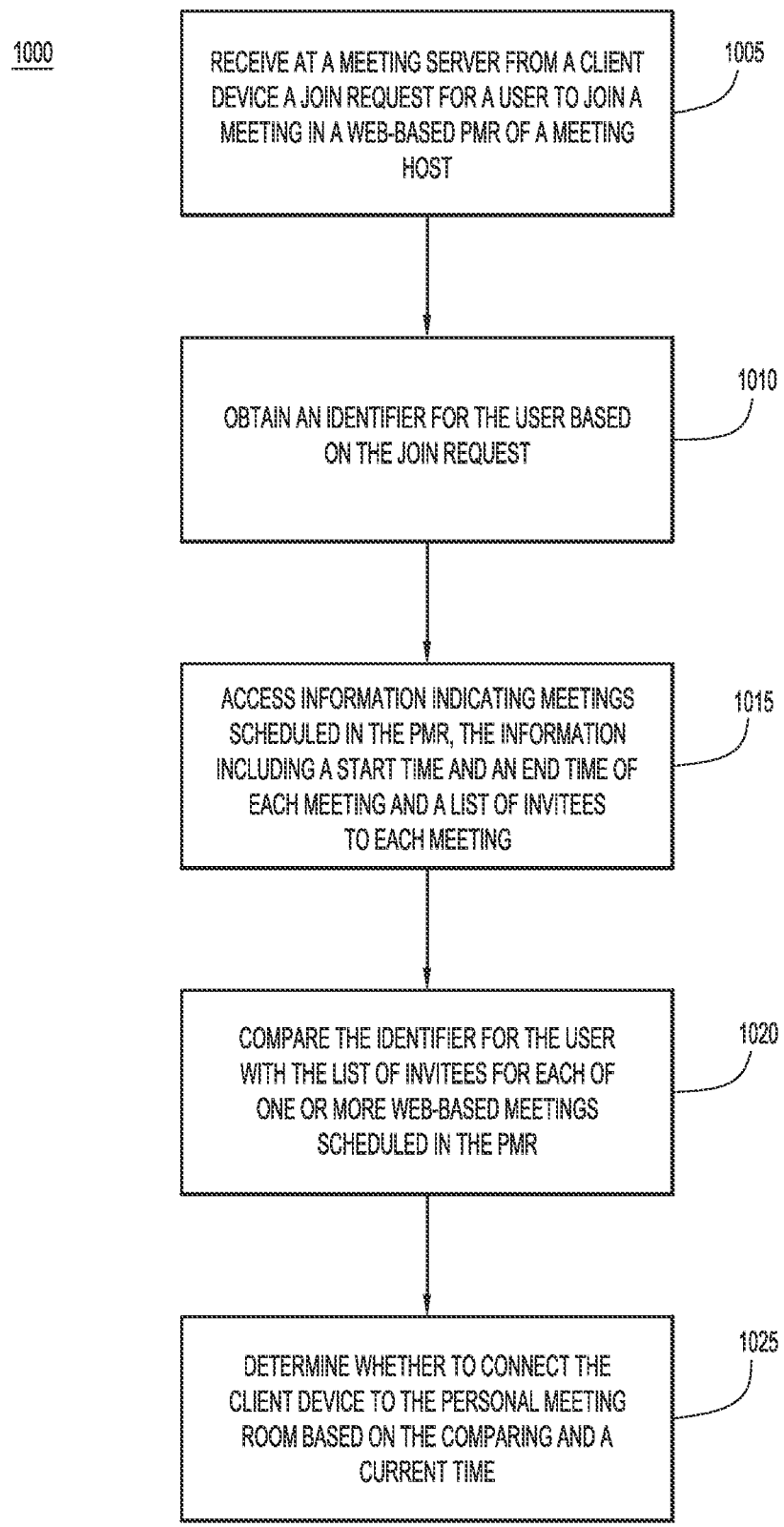
FIG. 10 is a flowchart of an example high-level method of controlling admittance of a user to a CMR/PMR meeting, according to an example embodiment.

With reference to FIG. 10, there is a flowchart of an example high-level method 1000 of handling an online meeting in a PMR. Method 1000 is initiated when a user clicks on a personal URL in an invitation causing his/her client device to send to meeting service 110 a join request for the user to join an online meeting in the PMR of the host.

At 1005, meeting service 110 receives from the client device the join request for the user to join the online meeting in the PMR of the host.

At 1010, meeting service 110 obtains a user identifier (e.g., user email address) based on the join request. Any of the techniques described above in connection with FIG. 4 may be used to obtain the user identifier.

At 1015, meeting service 110 accesses information indicating online meetings scheduled in the PMR based on the join request. Meeting service 110 may retrieve the information indicating the online meetings scheduled in the PMR based on the personal URL in the join request and a current time (i.e., time-of-day), as described above in connection with FIG. 4, by accessing information maintained by a calendar service. The accessed information includes a start time, an end time, and a list of invitees for each of the meetings retrieved based on the URL and the current time.

At 1020, meeting service 110 compares the user identifier (e.g., user email address) with the list of invitees (e.g., email addresses of the invitees) for each of one or more online meetings scheduled in the PMR.

At 1025, meeting service 110 determines whether to connect the client device (of the user) to the online meeting in the PMR based on the outcome of the comparing operation 1020 and the current time.

As an example, assume information for a first online meeting (referred simply as a "first meeting") was retrieved at 1015. A short time prior to a start time of the first meeting, e.g., 5 minutes prior to the start of the first meeting, meeting service 110 starts admitting users to the first meeting (i.e., connecting client devices that sent join requests to the PMR), even if the host of the first meeting is not present. Meeting service 110 does this at 1020 and 1025 by matching the email address of each invited participant to the calendar invite (i.e., to the list of invitees on the calendar invite).

When the current time is such that it is now time for the first meeting to occur, and a user "user A" attempts to join the first meeting by sending a join request, and user A is an invitee to the first meeting, user A is taken right into the first meeting (i.e., the client device that sent the join request on behalf of user A is connected to the PMR). If user A is not an invitee, user A waits in a virtual lobby (i.e., the client device is connected to the virtual lobby). If user A is the host, the host goes into the first meeting and is notified of any other users waiting in the virtual lobby. Alternatively, even if the host is not present, users who were invited into the first meeting can be notified of other users waiting in the virtual lobby, and admit the waiting users. This allows first meeting guests to be admitted and for the first meeting to take place even before the host has joined. On the other hand, if there is no scheduled meeting at the current time, all users wait in the virtual lobby until the host joins, and once the host joins, the waiting users are either admitted automatically, or the host admits them with further approval.

Next, Assume that information for the first meeting in the PMR and a second meeting in the PMR following the first meeting was retrieved at operation 1015. The two meetings may be back-to-back meetings. Embodiments presented herein introduce a predetermined transition period or window across the first and second meetings in which the virtual lobby may be used in connection with the PMR to handle users attempting to join one or more of the two meetings. In a first example, the transition period begins a predetermined time period (e.g., 5 minutes) before the end of the first meeting and ends a short time (defined further below) after the second meeting begins. In a second example, the transition period covers a time period that is during the first web-based meeting (i.e., while the first meeting is in progress in the PMR) and prior to an end time of the second meeting In other words, the first meeting ran long. Operations of meeting service 110 may be described in terms of four different categories of users attempting to join the first and second meetings during the transition period:

a. A user may be invited to neither the first meeting nor the second meeting;

b. A user may be invited to just the first meeting, and not the second meeting;

c. A user may be invited to just the second meeting, but not the first meeting; and d. A user may be invited to both the first and second meetings.

First and second embodiments for handling the above-listed different categories of invitees for back-to-back meetings during the transition period are described below in connection with FIGS. 11A and 11B, respectively. The first embodiment is also referred to as a "smart lobby" embodiment because it employs a virtual lobby that operates as a "smart" lobby as described herein. The smart lobby permits meeting service 110 to selectively enable or disable voice and/or video communication between client devices in the smart lobby under certain circumstances, as described below in connection with FIG. 11A. In contrast, the second embodiment employs a virtual lobby in which client devices are always communicatively isolated from one another, as described in connection with FIG. 11B.

Figure 11A:
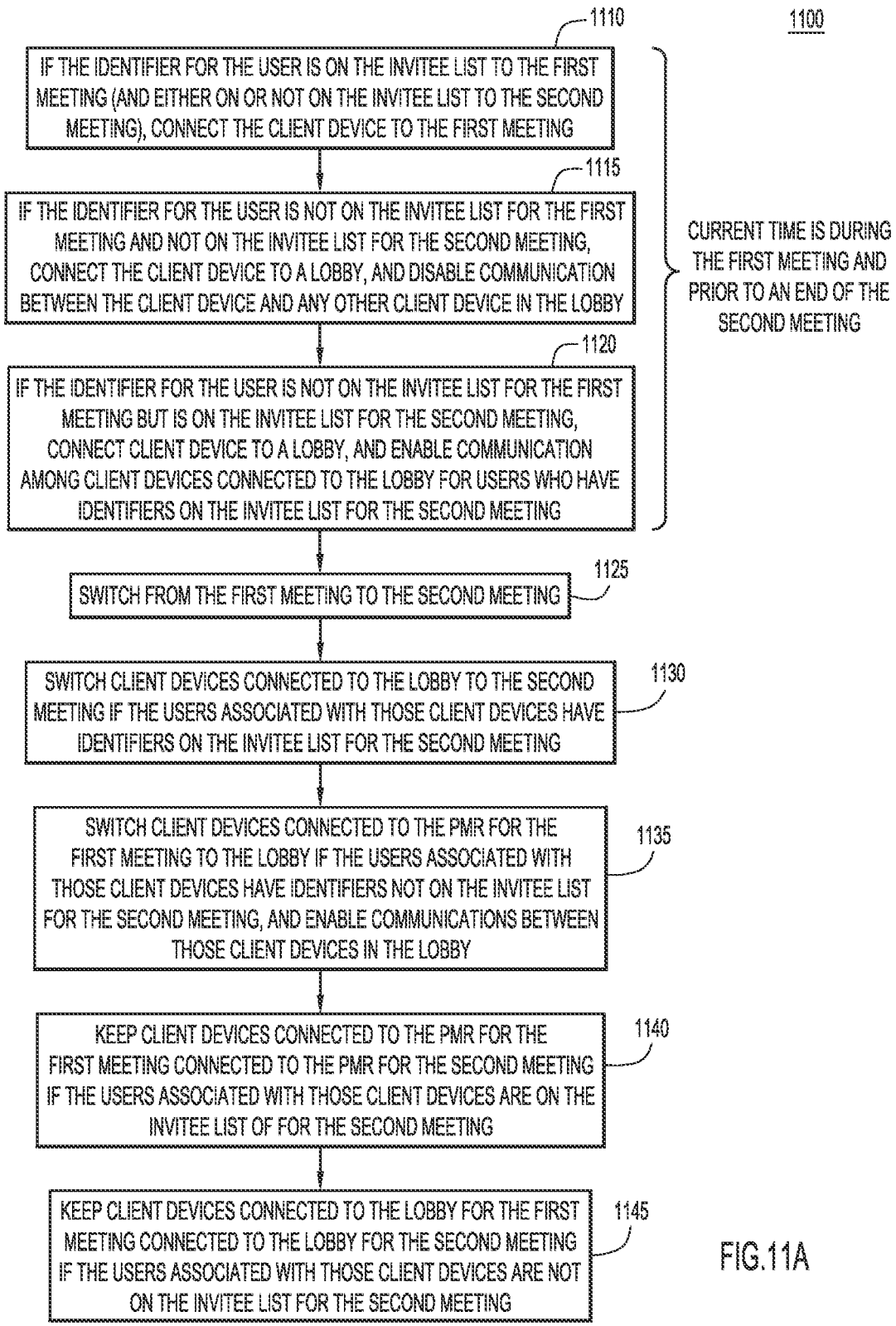
FIG. 11A is a flowchart of a method of controlling admittance of different categories of user invitees for back-to-back meetings in a personal meeting room performed by the meeting service when employing a "smart" lobby function, according to an example embodiment.

With reference to FIG. 11A, there is a flowchart of an example method 1100 of handling the above-listed different categories of invitees for back-to-back meetings during the transition period, performed by meeting service 110 according to the first or smart lobby embodiment. Method 1100 expands on operations 1020 and 1025 of method 1000. It is assumed that meeting service 110 has already accessed calendar information based on the join request from a client device for a user to join a meeting in a PMR, wherein the information indicates a first meeting in the PMR followed by a second meeting in the PMR, an invitee list (i.e., invitees) for each meeting, and start and stop times for each meeting. It is also assumed that meeting service 110 has obtained a user identifier based on the join request.

The operations of the meeting service 110 are dependent on a current time relative to the scheduled start and stop times of the first and second meetings. For example, if the current time is in the first example transition period mentioned above that includes period of time prior to an end of the first meeting and a start of the second meeting, meeting service 110 performs operations 1110-1120, described below. Similarly, if the current time is in the second example transition period mentioned above that is during the first meeting and prior to an end time of the second meeting, meeting service 110 performs operations 1110-1120.

At 1110, if the user identifier is on the invitee list to the first meeting (and is either on or not on the invitee list to the second meeting), meeting service 110 connects the client device to the first meeting and enables audio and/or voice communication between the client devices connected to the PMR. This is a case where the user is a late arriver to the first meeting or had previously dropped and then rejoined the first meeting.

At 1115, if the user identifier is not on the invitee list for the first meeting and not on the invitee list for the second meeting, meeting service 110 connects the client device to a virtual lobby (i.e., a smart lobby), and disables voice and/or video communication between the client device and any other client device in the lobby. Thus, the user is communicatively isolated in the lobby and unable to see or hear other users. In the ensuring description of method 1100, the term "lobby" means "smart lobby."

At 1120, if the user identifier is not on the invitee list for the first meeting but is on the invitee list for the second meeting, meeting service 110 connects client device to the lobby, and enables audio and video communication among other client devices connected to the lobby associated with users who have identifiers which are on the invitee list for the second meeting. In this case, the lobby functions as a mini-conference bridge to allow all users connected to the lobby that were invited to the second meeting to communicate with each other. This allows the second meeting to begin—in the lobby—prior to the first meeting ending. Thus, the lobby essentially isolates users not invited to the second meeting, but allows users that were invited to the second meeting to see/hear each other. This functionality is referred to as a "smart" lobby.

At 1125, responsive to a switch meeting event received from the host, meeting service 110 switches, i.e., transitions, from the first meeting to the second meeting; the first meeting ends and the second meeting begins. The host may perform the switch via a meeting user interface by leaving and then joining the second meeting, or through a dedicated, selectable "switch" user interface button. The meeting user interface may display to the host the users in the lobby that were invited to the second meeting.

As described above in connection with FIG. 9, meeting service 110 generates user interface 900 as a web-page for display at one or more of the client devices connected to the meeting service. In the PMR embodiment, meeting service 110 generates user interface 900 for display at one or more of the client devices connected to the PMR for a meeting in progress in the PMR. User interface 800 may be provided to client devices associated with the host of the meeting in the PMR and client devices associated with users that are not the host or owner of the PMR. There may be differences in the content and presentation of the user interface screen presented for the meeting host and meeting participants. User interface includes/presents a user selectable icon labeled "Switch" (i.e., the "switch" user interface button, mentioned above) that a user may select to switch the PMR from the meeting in progress in the PMR to another meeting in the PMR, assuming both meetings are scheduled/available for the switch. In the present example, assume the first meeting is in progress in the PMR and meeting server 110 presents user interface 900 to client devices associated with users and that are connected to the PMR for the first meeting. Also assume that the second meeting is accessible, e.g., the current time is within the transition period. When a user selects the Switch icon at an associated client device, meeting service 110 receives an indicator of the selection from the client device. Responsive to the indicator, meeting service switches from the first meeting to the second meeting in the PMR. The "switch" user interface button may be presented to and available to use by any participant in the meeting, including the meeting host and meeting participants/attendees.

Next operations 1130-1145 described below are responsive to the switch received from the host. Meeting service 110 monitors the current time, and performs operations 1130-1145 during the transition period, i.e., before the transition period ends.

At 1130, responsive to the switch from the first meeting to the second meeting, meeting service 110 switches client devices connected to the lobby to the second meeting if the users associated with those client devices have identifiers on the invitee list for the second meeting. Such users were in communication prior to the switch and continue to communicate after the switch. Thus, as to these users, the switch is a continuous operation accompanied by an indication that the host has arrived.

At 1135, responsive to the switch from the first meeting to the second meeting, meeting service 110 switches client devices connected to the PMR for the first meeting to the lobby if the users associated with those client devices have identifiers which are not on the invitee list for the second meeting, and enables audio and video communications between those client devices in the lobby. This allows users of client devices switched from the first meeting to the lobby to continue the first meeting in the lobby.

At 1140, responsive to the switch from the first meeting to the second meeting, meeting service 110 keeps client devices which were connected to the PMR for the first meeting connected to the PMR for the second meeting (i.e., maintains the existing connection with the PMR for those client devices) if the users associated with those client devices are on the invitee list of for the second meeting.

At 1145, responsive to the switch from the first meeting to the second meeting, meeting service 110 keeps client devices which were connected to the lobby for the first meeting connected to the lobby for the second meeting (i.e., maintains the existing connection with the lobby for those client devices) and keeps those client devices communicatively isolated if the users associated with those client devices are not on the invitee list for the second meeting. The host may, at his/her control, admit these users to the second meeting.

In the above operations, users joined to the first meeting before the switch operation at 1125 and who transition into the lobby after the switch operation are able to communicate with each other—not only the users that were on the calendar invite for the first meeting. Thus, for example, if a user had been invited to the first meeting ad-hoc and was admitted by the host, then after the meeting transition, the user is not ejected or placed into the lobby in communicative isolation. This allows all users in the first meeting to continue their discussion; all that has changed is that the host is gone.

The second example transition period mentioned above ends during the first meeting upon switching from the first meeting to the second meeting in the PMR. This handles a scenario in which the host of the first meeting in the PMR switches to the second meeting after a scheduled end time of the first meeting; in other words, when the first meeting is running longer than expected. Thus, if the first meeting is still in progress in the PMR, and running late, users/client devices will wait in the lobby (i.e., remain connected to the lobby) for the second meeting to start as long as the first meeting is still in progress.

The first example transition period begins a predetermined period, e.g., 5 minutes, before the end of the scheduled time of the first meeting, assuming the first meeting is still in progress. This transition period ends at a later one of the following:

a. A predetermined time, e.g., 5 mins, after the start of the second meeting/end of the first meeting;
b. The departure of the last user from the lobby, amongst those users in the lobby that were in the first meeting (in other words, the meeting ends when everyone leaves); and
c. In all cases a predetermined time period, e.g., 5 mins, before the start of a next online meeting in the calendar, e.g., a third online meeting. This puts an upper bound on how long an online meeting can "spill over."

Figure 11B:
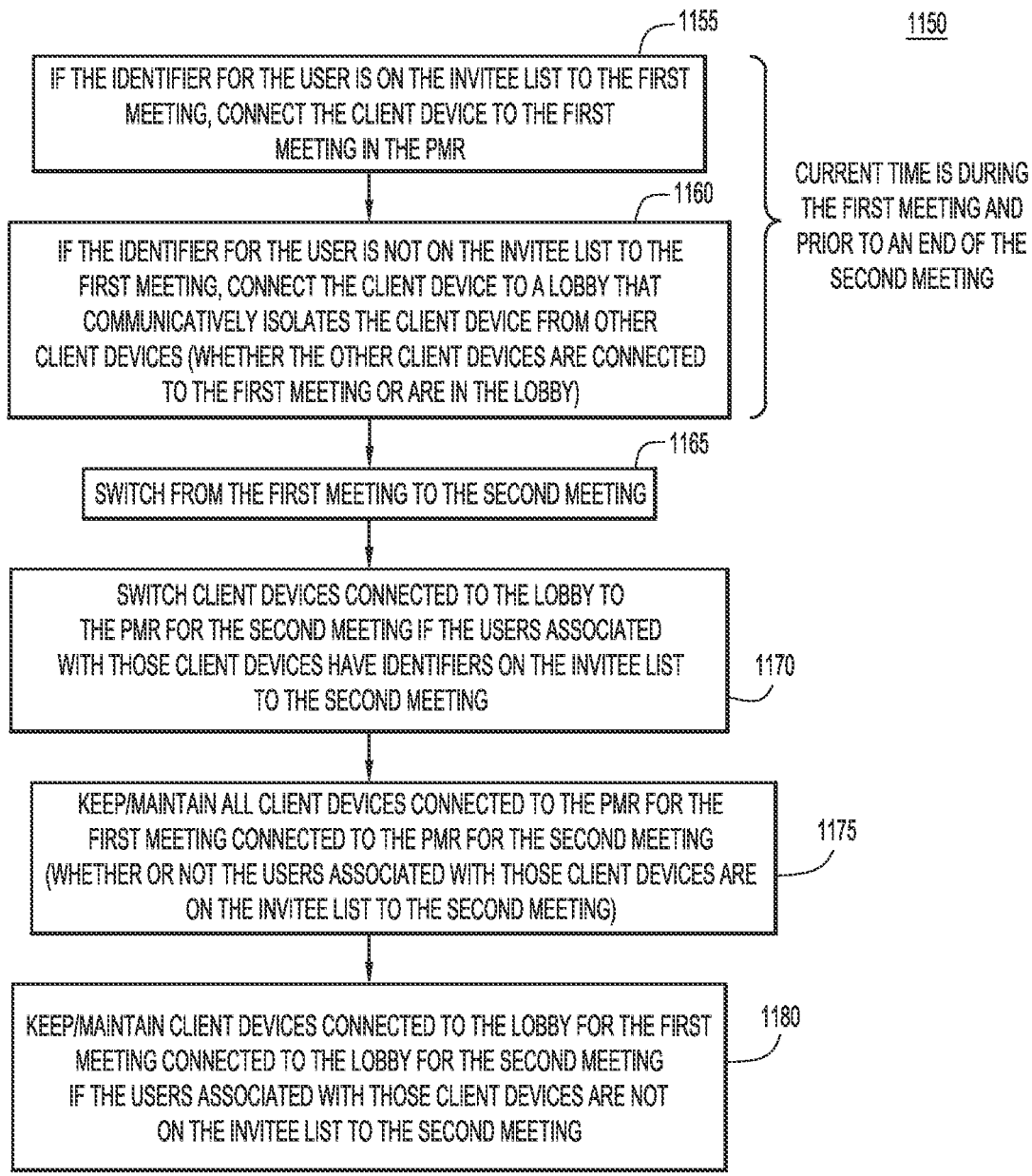
FIG. 11B is a flowchart of a method of controlling admittance of different categories of user invitees for back-to-back meetings in a personal meeting room performed by the meeting service when not employing the smart lobby function, according to an example embodiment.

With reference to FIG. 11B, there is a flowchart of an example method 1150 of handling the above-listed different categories of invitees for back-to-back meetings during the transition period, performed by meeting service 110 according to the second embodiment. Method 1150 expands on operations 1020 and 1025 of method 1000. It is assumed that meeting service 110 has already accessed calendar information based on the join request from a client device for a user to join a meeting in a PMR, wherein the information indicates a first meeting in the PMR followed by a second meeting in the PMR, an invitee list (i.e., invitees) for each meeting, and start and stop times for each meeting. It is also assumed that meeting service 110 has obtained a user identifier based on the join request.

At 1155, similar to operation 1110 described above, if the user identifier is on the invitee list to the first meeting (and is either on or not on the invitee list to the second meeting), meeting service 110 connects the client device to the first meeting and enables audio and/or voice communication between the client devices connected to the PMR.

At 1160, if the user identifier is not on the invitee list to the first meeting, meeting service 110 connects the client device to a lobby in which the client device is communicatively isolated from other client devices, whether the other client devices are connected to the first meeting or are also in the lobby. In other words, meeting service 110 disables audio and/or video communication between client devices connected to the lobby. Thus, the lobby employed in method 1150 does not operate as a smart lobby as used by method 1100 of FIG. 11A.

At 1165, similar to operation 1125 described above, responsive to a switch meeting event received from the host, meeting service 110 switches, i.e., transitions, from the first meeting to the second meeting; the first meeting ends and the second meeting begins.

Next, operations 1170-1180 described below are responsive to the switch command received from the host. Meeting service 110 monitors the current time (i.e., time of day), and performs operations 1170-1180 during the transition period, i.e., before the transition period ends.

At 1170, meeting service 110 switches client devices connected to the lobby to the PMR for the second meeting if the users associated with those client devices have identifiers on the invitee list to the second meeting.

At 1175, meeting service 110 keeps all of the client devices connected to the PMR for the first meeting connected to the PMR for the second meeting, whether the users associated with those client devices are on the invitee list or are not on the invitee list to the second meeting. In another embodiment, the meeting service 110 could also disconnect all client devices connected to the PMR for the first meeting, which are not invited to the second meeting.

At 1180, meeting service 110 keeps client devices connected to the lobby for the first meeting connected to the lobby for the second meeting if the users associated with those client devices are not on the invitee list to the second meeting.

Methods 1100 and 1150 each uses the "switch" in operation 1125/1165 to delineate the end of one online meeting and the start of the next online meeting, even though these meetings both take place in a single online meeting room-with-lobby construct. This, in fact, emulates how meetings work in real life. This existence of a firm switch means that post-meeting artifacts—such as recordings and saved chat sessions, can be treated independently and linked to the correct scheduled online meeting in the calendar.

FIGS. 12-18 are diagrams that provide example illustrations of how users in different invitee categories transition between an online meeting room and a virtual lobby during first and second back-to-back meetings, meeting1 and meeting2, in the meeting room in accordance with method 1100. In FIGS. 12-18, the meeting room may be representative of a PMR and the users are referred to as meeting "participants." Participants are depicted as circles in FIGS. 12-18.

Figure 12:
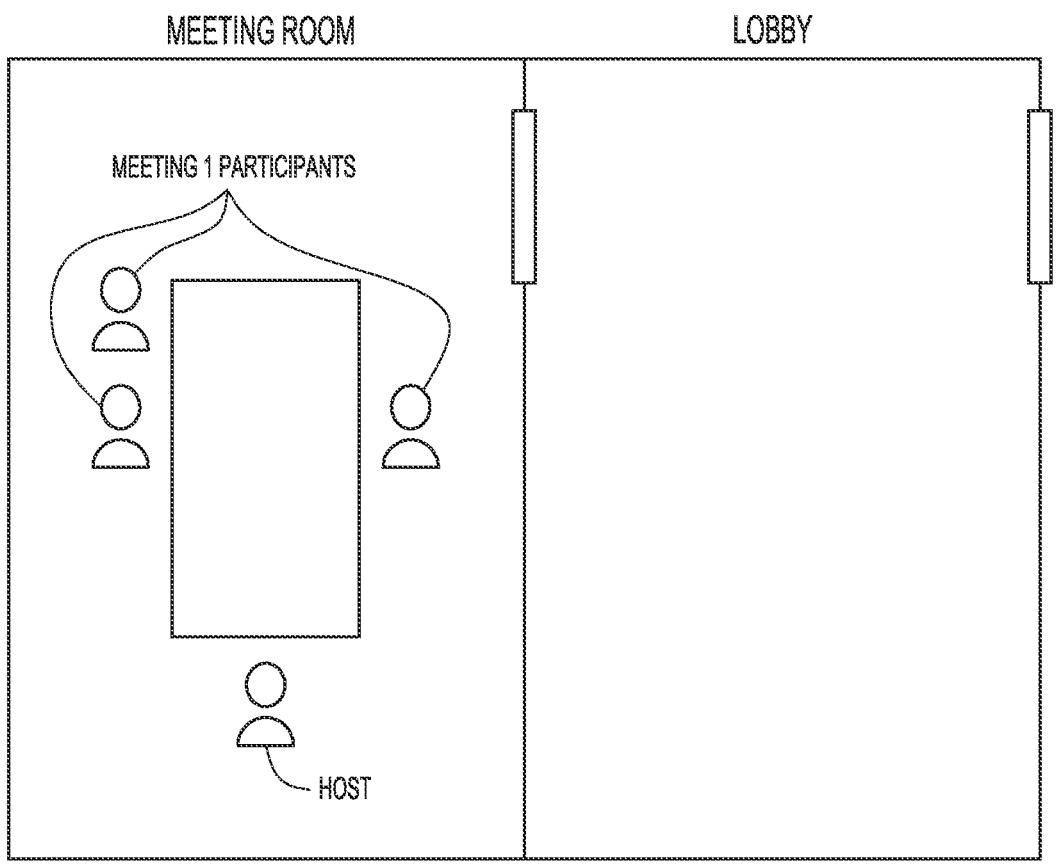
FIG. 12 is an illustration of a web-based personal meeting room and a web-based lobby while a first meeting is in progress, according to an example embodiment.

With reference to FIG. 12, there is an illustration of the meeting room and the lobby while the first meeting, meeting1, is in progress. Meeting1 includes three meeting1 participants and a host, while the lobby is empty.

Figure 13:
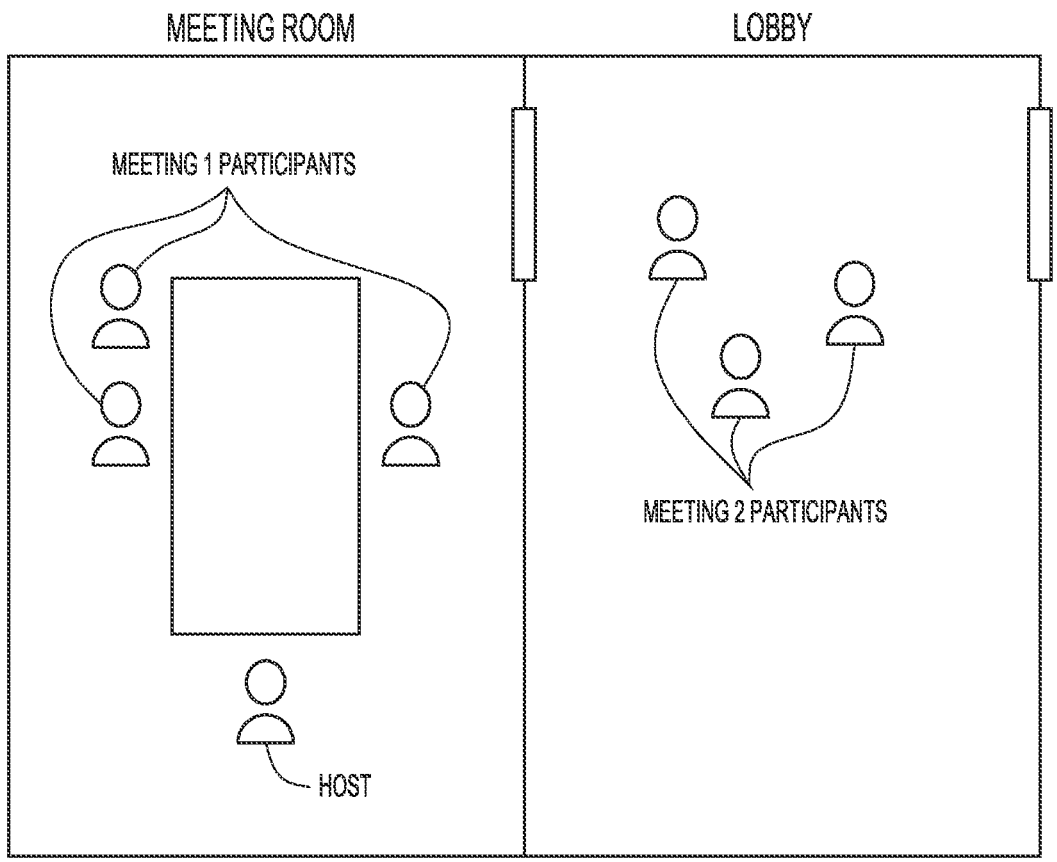
FIG. 13 is an illustration of the web-based personal meeting room and the web-based lobby 3 minutes before the first meeting ends, according to an example embodiment.

FIG. 13 illustrates the meeting room and the lobby 3 mins before the second meeting, meeting2, starts. Three participants invited to meeting2 (i.e., meeting2 participants) show up and are directed to the lobby, where they are able to converse with each other.

Figure 14:
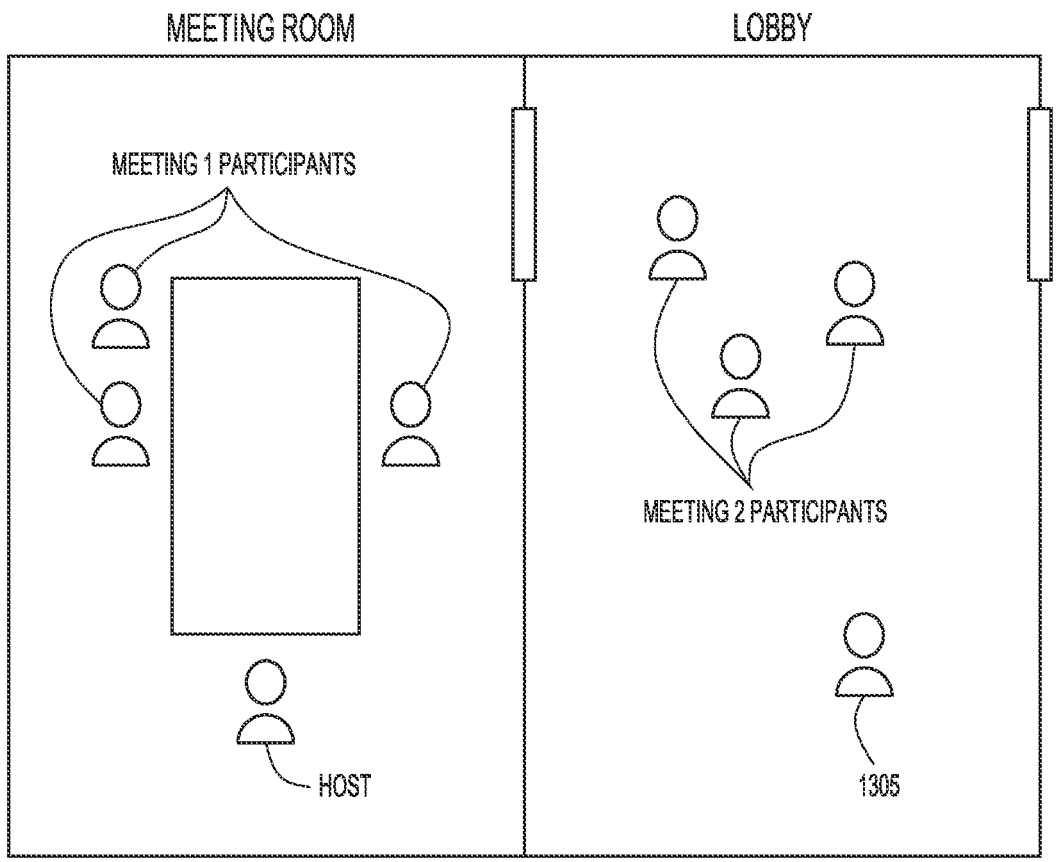
FIG. 14 is an illustration of the web-based personal meeting room and the web-based lobby 2 minutes before the first meeting ends, according to an example embodiment.

FIG. 14 shows the conference room and the lobby 2 mins before the second meeting, meeting2, starts. A participant 1305 not invited to either meeting1 or meeting2 shows up and is directed into the lobby and is communicatively isolated from other participants in the lobby.

Figure 15:
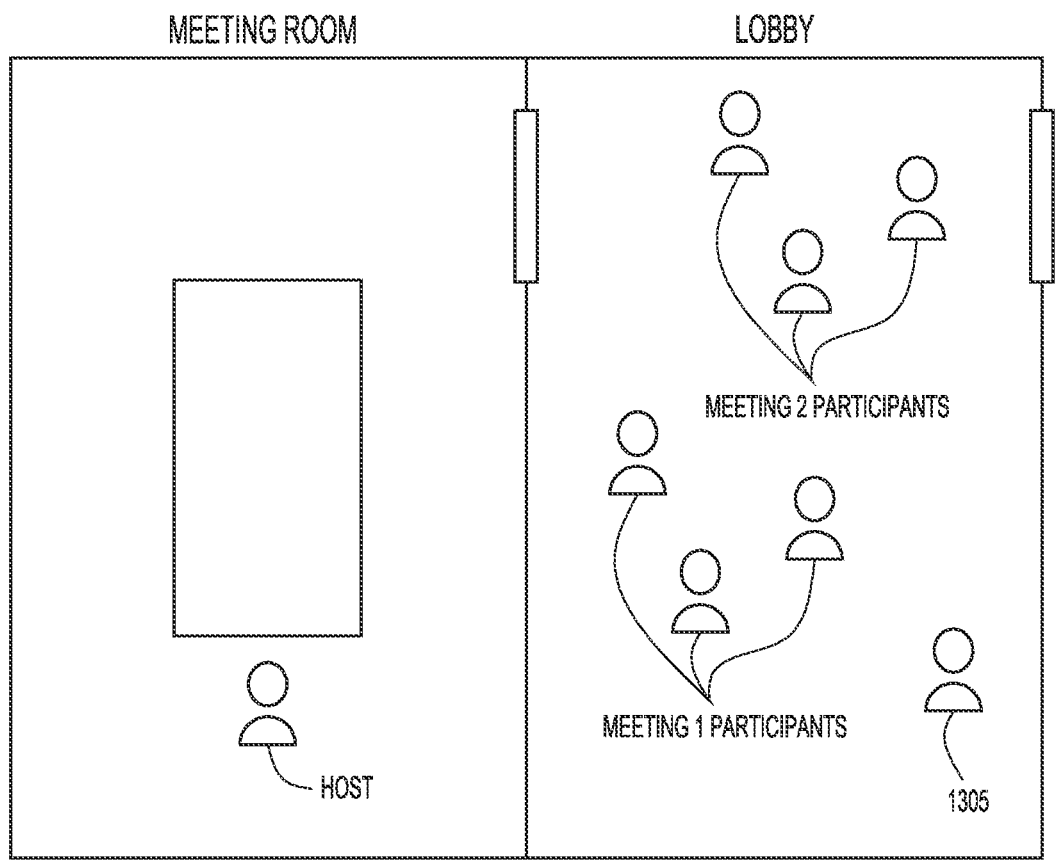
FIG. 15 is an illustration of the web-based personal meeting room and the web-based lobby just after a host of the first meeting has declared that the first meeting is over, according to an example embodiment.

FIG. 15 shows the conference room and the lobby just after the host has declared that meeting1 is over. Participant 1305 remains in the lobby, in isolation from all other participants. The meeting1 participants move from meeting1 to the lobby, but remain in communication with each other. FIG. 15 represents an intermediate state that occurs if there is a time lag between the times when meeting1 ends and meeting2 begins. This intermediate state is not described above in connection with FIGS. 11A and 11B because in those embodiments meeting1 and meeting2 end and begin at the same time. The intermediate state represents an optional implementation or alternative embodiment.

Figure 16:
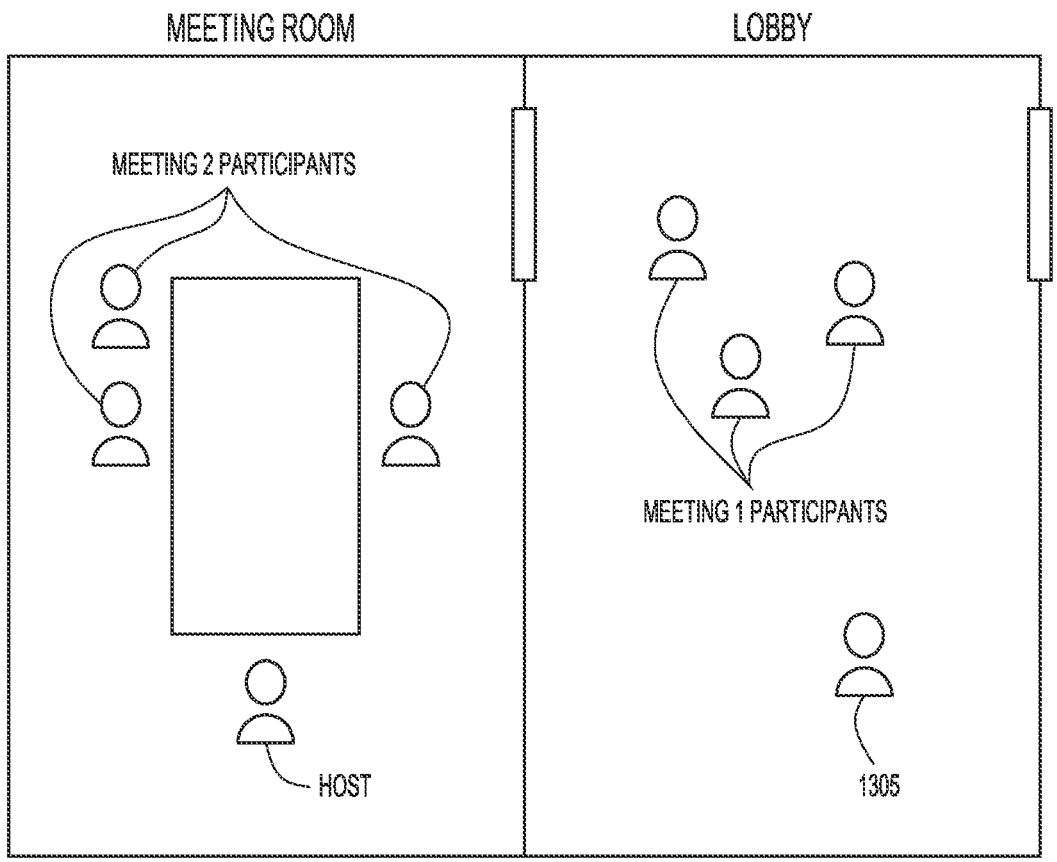
FIG. 16 is an illustration of the web-based personal meeting room and the web-based lobby just after a host of the first meeting has declared that the first meeting is over, according to an example embodiment.

FIG. 16 illustrates the meeting room and the lobby just after the host has declared that meeting 2 is starting. Participant 1305 remains in the lobby, in isolation from all other participants. The meeting2 participants move from the lobby to the meeting room for meeting2.

Figure 17:
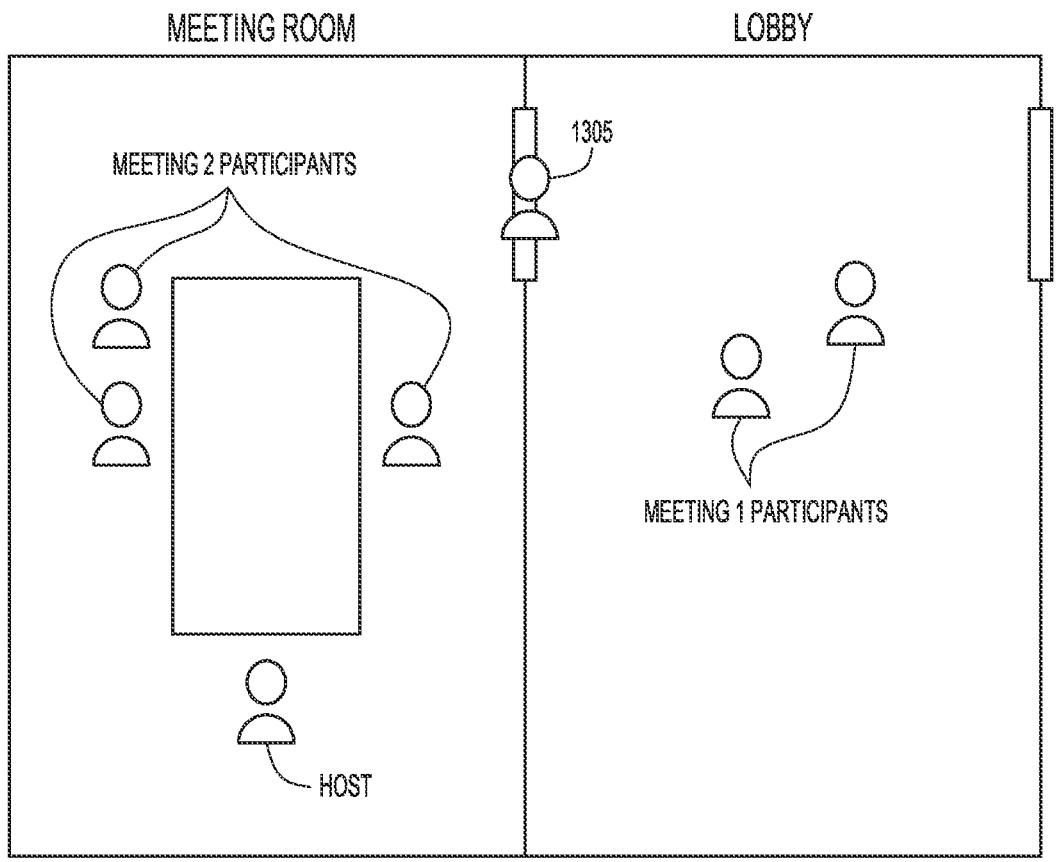
FIG. 17 is an illustration of the web-based personal meeting room and the web-based lobby after a participant in the first meeting has left the lobby, according to an example embodiment.

FIG. 17 shows the meeting room and the lobby after one of the meeting1 participants has left the lobby. Participant 1305 sends a join request to the host to ask to join meeting2.

Figure 18:
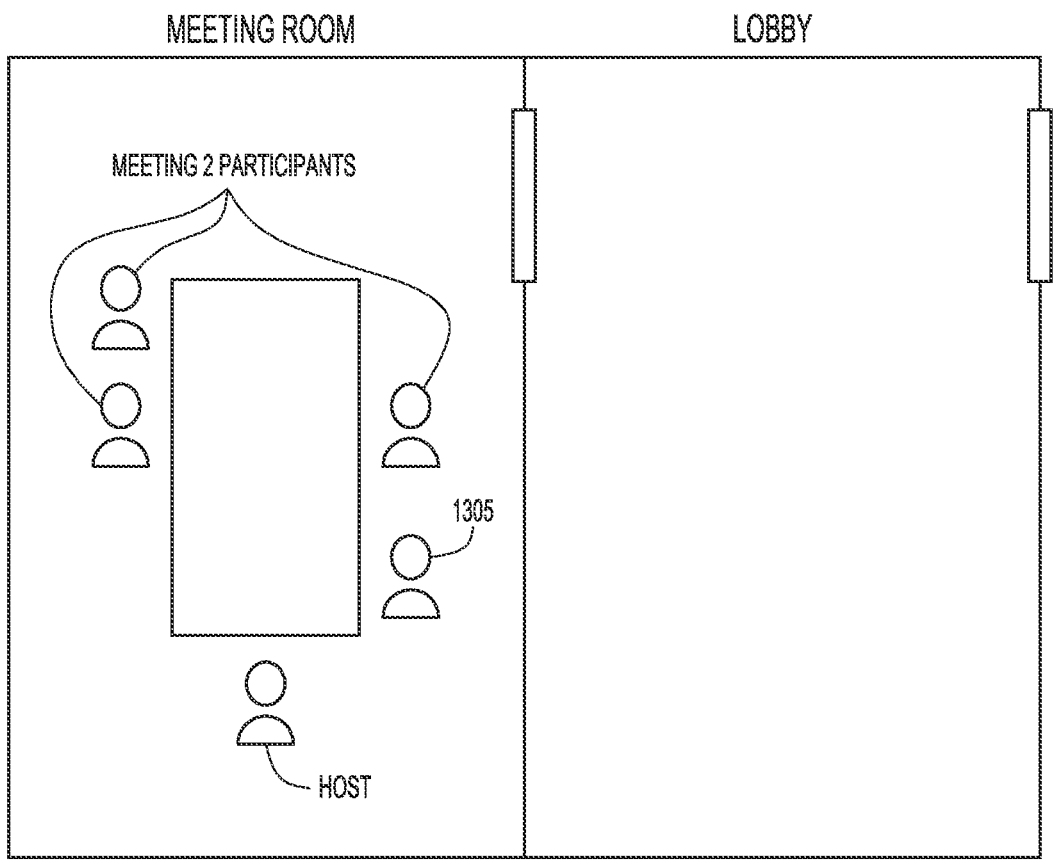
FIG. 18 is an illustration of the web-based personal meeting room and the web-based lobby 2 after the host admits a participant in the lobby into a second meeting in the web-based personal meeting room, according to an example embodiment.

FIG. 18 shows the meeting room and the lobby after the host admits participant 1305 to meeting2 in response to the join request. Remaining meeting1 participants have left the lobby.

Figure 19:
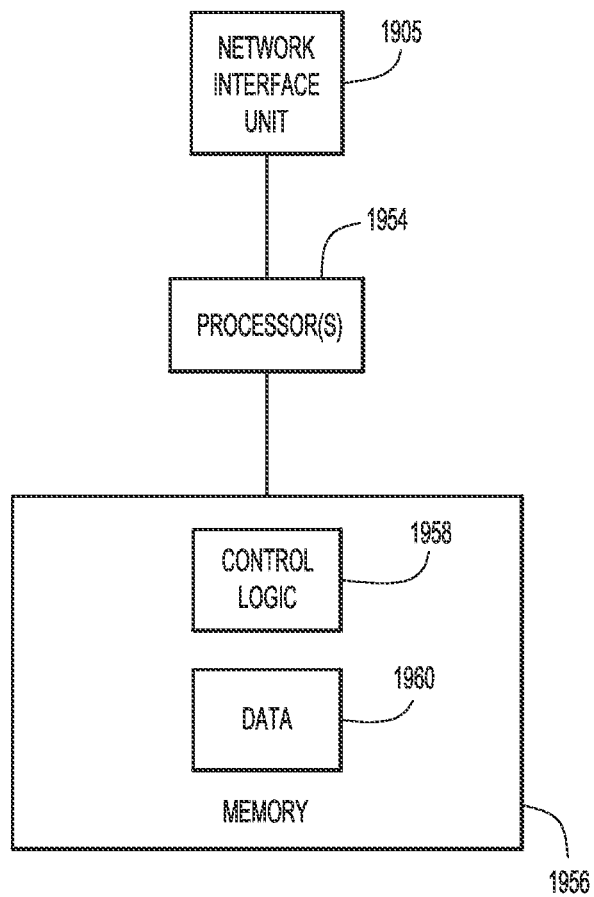
FIG. 19 is a block diagram of a computer system to host the meeting service and perform the operations described herein, according to an example embodiment.

With reference to FIG. 19, there is a block diagram of an example computer device 1900 for hosting/implementing meeting service 110. Computer device 1900 may represent meeting server 108. Computer device 1900 includes network interface unit 1905 to communicate with a wired and/or wireless communication network so as to communicate with calendar service 106 and client devices 102, a processor 1954 (or multiple processors, which may be implemented as software or hardware processors), and memory 1956. Network interface unit 1905 may include an Ethernet card (or multiple such devices) including one or more network ports to connect with and communicate over wired Ethernet links and/or a wireless communication card including a wireless transceiver and an antenna to communicate over wireless links.

Memory 1956 stores instructions for implementing methods described herein. Memory 1956 may include read only memory (ROM), random access memory (RAM), magnetic disk storage media devices, optical storage media devices, flash memory devices, electrical, optical, or other physical/tangible (non-transitory) memory storage devices. The processor 1954 is, for example, a microprocessor or a microcontroller that executes instructions stored in memory. Thus, in general, the memory 1956 may comprise one or more tangible computer readable storage media (e.g., a memory device) encoded with software comprising computer executable instructions and when the software is executed (by the processor 1954) it is operable to perform the operations described herein. Memory 1956 stores control logic 1958 to perform operations of meeting service 110 described herein, so as to implement methods 300, 400, 1000, and 1100 and 1150, for example. The memory 1956 may also store data 1960 used and generated by logic 1958.

In summary, in accordance with a first embodiment, a solution is provided for controlling admission of users to an online meeting. In the solution, a meeting service access meeting information from a calendaring system of a user. The meeting information gathers a list of attendees invited to an online meeting hosted by that user. When a time of the online meeting arrives, users click on a meeting link in an online meeting invite to join the online meeting. If the email address of the user clicking on the link matches the list of invitees from the calendar, that user is admitted into the online meeting (i.e., the user's client device is connected to the online meeting). The solution addresses limitations of conventional systems with respect to admitting users to an online meeting. In conventional systems meeting admittance is based solely on knowledge of a join link or a password in an online meeting invite, whereas the system and method presented ensure that only invitees on an original online meeting invite by a host are actually admitted to the online meeting. Users to whom the invite has been forwarded, or to whom the join link has been sent out of band, are not admitted to the online meeting. There is no need for audio prompts and thus there are no annoying prompts played during the meeting when a user joins. Whereas conventional systems require authentication on an online meeting site, the system and method presented herein works cross-company or cross-site online meetings. Furthermore, this solution does not require guests to "sign in"; note that while the embodiments presented herein use forward email verification to verify a user's identity, this does not require a password and no password is created for these guests on the meeting service.

In accordance with a second embodiment, a solution for improving CMR/PMR experiences is provided. The solution uses a calendar of a host to smartly place users into an online meeting in a CMR/PMR. If a user is in the calendar invite for the meeting, that user is directed into the online meeting. Otherwise, that user waits in a virtual lobby, even if the host is not in the hosted online meeting. For back-to-back online meetings, the host performs a "switch" operation when the host is finished with the first online meeting "meeting1" and wants to start the second online meeting "meeting2." Users in meeting2 who show up before meeting1 has ended sit in the CMR/PMR lobby but can communicate with each other in order to start the online meeting before the host arrives. After the switch, users in the current meeting are directed to the lobby, and vice versa. This allows meeting1 to continue in the lobby—without the host, who is now in meeting2—with the participants that were invited to meeting2. This solution has many advantages and overcomes the challenges of meetings in a CMR/PMR, as follows:

a. Even if the host is late to an online meeting, the meeting can start without the host for all participants on the meeting invite.

b. Handling of back-to-back online meetings is improved. There is no requirement that the host lock or unlock the CMR/PMR—just to switch meetings, which is a much more natural gesture. Furthermore, the solution ensures that users always end up in the correct online meeting.

c. Attackers that know the CMR/PMR URL cannot gain entrance to an online meeting even if the host is present, while invited users have smooth meeting join experiences.

d. If a host leaves the meeting early, the meeting does not end, which avoids a disruption in the online meeting.

In one form, a computer-implemented method is provided comprising: receiving at a meeting server from a client device a join request for a user to join a scheduled meeting; obtaining an identifier for the user based on the join request; accessing information for the meeting based on the join request, the information including a list of invitees for the meeting; comparing the identifier for the user with the list of invitees for the meeting; and determining whether to connect the client device to the meeting based on the comparing.

In another form, an apparatus is provided comprising: a network interface unit configured to communicate with a network; and a processor of a meeting server, coupled to the network interface unit, and configured to: receive at the meeting server from a client device a join request for a user to join a scheduled meeting; obtain an identifier for the user based on the join request; access information for the meeting based on the join request, the information including a list of invitees for the meeting; compare the identifier for the user with the list of invitees for the meeting; and determine whether to connect the client device to the meeting based on the compare.

In yet another form, a non-transitory computer readable storage media encoded with instructions is provided. The instructions, when executed by a processor of a meeting server, cause the processor to: receive at the meeting server from a client device a join request for a user to join a scheduled meeting; obtain an identifier for the user based on the join request; access information for the meeting based on the join request, the information including a list of invitees for the meeting; compare the identifier for the user with the list of invitees for the meeting; and determine whether to connect the client device to the meeting based on the compare.

In yet another form, a computer-implemented method is provided comprising: receiving at a meeting server from a client device a join request for a user to join a web-based meeting in a web-based personal meeting room (PMR) of a meeting host; obtaining an identifier for the user based on the join request; accessing information indicating web-based meetings scheduled in the PMR, the information including a start time and an end time of each web-based meeting and a list of invitees to each web-based meeting scheduled in the PMR; comparing the identifier for the user with the list of invitees for each of one or more web-based meetings scheduled in the PMR; and determining whether to connect the client device to the PMR based on the comparing and a current time.

In yet another form, an apparatus is provided comprising: a network interface unit configured to communicate with a network; and a processor of a meeting server, coupled to the network interface unit, and configured to: receive at the meeting server from a client device a join request for a user to join a web-based meeting in a web-based personal meeting room (PMR) of a meeting host; obtain an identifier for the user based on the join request; access information indicating web-based meetings scheduled in the PMR, the information including a start time and an end time of each web-based meeting and a list of invitees to each web-based meeting scheduled in the PMR; compare the identifier for the user with the list of invitees for each of one or more web-based meetings scheduled in the PMR; and determine whether to connect the client device to the PMR based on the compare and a current time.

In yet another form, a non-transitory computer readable storage media encoded with instructions is provided. The instructions, when executed by a processor of a meeting server, cause the processor to receive at the meeting server from a client device a join request for a user to join a web-based meeting in a web-based personal meeting room (PMR) of a meeting host; obtain an identifier for the user based on the join request; access information indicating web-based meetings scheduled in the PMR, the information including a start time and an end time of each web-based meeting and a list of invitees to each web-based meeting scheduled in the PMR; compare the identifier for the user with the list of invitees for each of one or more web-based meetings scheduled in the PMR; and determine whether to connect the client device to the PMR based on the compare and a current time.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
receiving at a meeting server from a client device a first join request for a user to join a scheduled web-based meeting, the first join request being based on a first join link;
determining, based on the first join request, that the user is not a registered user associated with the meeting server;
obtaining from the client device, at least in part in response to determining that the user is not a registered user associated with the meeting server, an email address for the user by:
sending to the client device a request for an email address for the user, and
receiving from the client device a message responsive to the request, the message including the email address for the user;
accessing information for the scheduled web-based meeting based on the first join request, the information including a list of invitees for the scheduled web-based meeting, the list of invitees comprising email addresses of the invitees to the scheduled web-based meeting;
determining whether the email address for the user obtained from the client device is one of the email addresses on the list of invitees for the scheduled web-based meeting;
sending, by the meeting server, an email message to the email address for the user in response to determining that the email address for the user obtained from the client device is one of the email addresses on the list of invitees, the email message including a unique join link to join the scheduled web-based meeting that is different than the first join link;
connecting, by the meeting server, the client device to the scheduled web-based meeting in response to receiving a second join request for the user to join the scheduled web-based meeting that includes the unique join link contained in the email message; and
denying connection of the client device to the scheduled web-based meeting in response to determining that the email address for the user obtained from the client device is not one of the email addresses on the list of invitees.

2. The method of claim 1, wherein the scheduled web-based meeting is in a web-based personal meeting room, and wherein the first join request is received in response to the user selecting the first join link, wherein the first join link is associated with the web-based personal meeting room.

3. The method of claim 2, wherein the information indicates a start time and an end time of each of zero or more web-based meetings scheduled in the web-based personal meeting room and a list of invitees to each of the zero or more web-based meetings, the method further comprising:
identifying each of the zero or more web-based meetings for which a time of day time that is based on when the first join request was received is (i) within a first predetermined period prior to a start time for the web-based meeting, (ii) within a second predetermined time after an end time of the web-based meeting, or (iii) between the start time and the end time of the web-based meeting, inclusively,
wherein the determining includes determining whether the email address for the user is on a list of attendees of the zero or more web-based meetings.

4. The method of claim 1, wherein accessing the information for the scheduled web-based meeting comprises accessing information maintained by a calendar service.

5. The method of claim 1, further comprising:
in response to receiving the second join request, sending to the client device for storage at the client device an indicator that is associated with the email address of the user;
receiving at the meeting server a third join request for a later web-based meeting;
determining that the third join request for the later web-based meeting includes an indicator of the email address for the user, the indicator having been previously sent by the meeting server and stored at the client device;
obtaining the email address for the user based on the indicator included in the third join request; and
determining to connect the client device to the later web-based meeting at least in part in response to the obtaining of the email address.

6. The method of claim 5, wherein the indicator is a cookie stored at the client device.

7. The method of claim 1, wherein obtaining from the client device the email address comprises:
presenting a prompt to the client device for the user to enter the email address prior to admitting the client device to the scheduled web-based meeting.

8. The method of claim 1, wherein the accessing further includes accessing the information based on a time-of-day at which the first join request is received.

9. The method of claim 1, wherein the obtaining from the client device the email address for the user is at least in part in response to determining that the first join request does not include an indicator of the email address for the user.

10. An apparatus comprising:
a network interface unit configured to communicate with a network; and
a processor of a meeting server, coupled to the network interface unit, and configured to:
receive at the meeting server from a client device a first join request for a user to join a scheduled web-based meeting, the first join request being based on a first join link;
determine, based on the first join request, that the user is not a registered user associated with the meeting server;
obtain from the client device, at least in part in response to a determination that the user is not a registered user associated with the meeting server, an email for the user by:
sending to the client device a request for an email address for the user, and
receiving from the client device a message responsive to the request, the message including the email address for the user;
access information for the scheduled web-based meeting based on the first join request, the information including a list of invitees for the scheduled web-based meeting, the list of invitees comprising email addresses of the invitees to the scheduled web-based meeting;
determine whether the email address for the user obtained from the client device is one of the email addresses on the list of invitees for the scheduled web-based meeting;
send, by the meeting server, an email message to the email address for the user in response to determining that the email address for the user obtained from the client device is one of the email addresses on the list of invitees, the email message including a unique join link to join the scheduled web-based meeting that is different than the first join link;
connect, by the meeting server, the client device to the scheduled web-based meeting in response to receiving a second join request for the user to join the scheduled web-based meeting that includes the unique join link contained in the email message; and
deny connection of the client device to the scheduled web-based meeting in response to determining that the email address for the user obtained from the client device is not one of the email addresses on the list of invitees.

11. The apparatus of claim 10, wherein the scheduled web-based meeting is in a web-based personal meeting room, and wherein the first join request is received in response to the user selecting the first join link, wherein the first join link is associated with the web-based personal meeting room.

12. The apparatus of claim 11, wherein the information indicates a start time and an end time of each of zero or more web-based meetings scheduled in the web-based personal meeting room and a list of invitees to each of the zero or more web-based meetings, and the processor is further configured to:
identify each of the zero or more web-based meetings for which a time of day time that is based on when the first join request was received is (i) within a first predetermined period prior to a start time for the web-based meeting, (ii) within a second predetermined time after an end time of the web-based meeting, or (iii) between the start time and the end time of the web-based meeting, inclusively,
wherein the processor is configured to determine by determining whether the email address for the user is on a list of attendees of the zero or more web-based meetings.

13. The apparatus of claim 10, wherein the processor is further configured to:
in response to the second join request being received, send to the client device for storage at the client device an indicator that is associated with the email address of the user;
receive at the meeting server a third join request for a later web-based meeting;
determine if a third join request for a later web-based meeting that is received at the meeting server an indicator of the email address for the user, the indicator having been previously sent by the meeting server and stored at the client device;
obtain the email address for the user based on the indicator included in the third join request; and
determine to connect the client device to the later web-based meeting at least in part in response to obtaining the email address.

14. The apparatus of claim 10, wherein the processor is configured to obtain from the client device the email address comprises the processor being configured to:
present a prompt to the client device for the user to enter an email address prior to admitting the client device to the scheduled web-based meeting.

15. The apparatus of claim 10, wherein the processor is configured to obtain from the client device the email address for the user at least in part in response to determining that the first join request does not include an indicator of the email address for the user.

16. The apparatus of claim 10, wherein the processor is configured to access the information for the scheduled web-based meeting, at least in part, by accessing information maintained by a calendar service.

17. A non-transitory computer readable storage media encoded with instructions that, when executed by a processor of a meeting server, cause the processor to:
receive at the meeting server from a client device a first join request for a user to join a scheduled web-based meeting, the first join request being based on a first join link;
determine, based on the first join request, that the user is not a registered user associated with the meeting server;
obtain from the client device, at least in part in response to a determination that the user is not a registered user associated with the meeting server, an email address for the user by:

sending to the client device a request for an email address for the user, and receiving from the client device a message responsive to the request, the message including the email address for the user;

access information for the scheduled web-based meeting based on the first join request, the information including a list of invitees for the scheduled web-based meeting, the list of invitees comprising email addresses of the invitees to the scheduled web-based meeting;

determine whether the email address for the user obtained from the client device is one of the email addresses on the list of invitees for the scheduled web-based meeting;

send, by the meeting server, an email message to the email address for the user in response to determining that the email address for the user obtained from the client device is one of the email addresses on the list of invitees, the email message including a unique join link to join the scheduled web-based meeting that is different than the first join link;

connect, by the meeting server, the client device to the scheduled web-based meeting in response to receiving a second join request for the user to join the scheduled web-based meeting that includes the unique join link contained in the email message; and deny connection of the client device to the scheduled web-based meeting in response to determining that the email address for the user obtained from the client device is not one of the email addresses on the list of invitees.

18. The non-transitory computer readable storage media of claim 17, wherein the scheduled web-based meeting is in a web-based personal meeting room, and wherein the first join request is received in response to the user selecting the first join link, wherein the first join link is associated with the web-based personal meeting room.

19. The non-transitory computer readable storage media of claim 18, wherein the information indicates a start time and an end time of each of zero or more web-based meetings scheduled in the web-based personal meeting room and a list of invitees to each of the zero or more web-based meetings, further comprising instructions to cause the processor to:

identify each of the zero or more web-based meetings for which a time of day time that is based on when the first join request was received is (i) within a first predetermined period prior to a start time for the web-based meeting, (ii) within a second predetermined time after an end time of the web-based meeting, or (iii) between the start time and the end time of the web-based meeting, inclusively, wherein the instructions to cause the processor to determine include instructions to cause the processor to determine whether the email address for the user is on a list of attendees of the zero or more web-based meetings.

20. The non-transitory computer readable storage media of claim 17, further comprising instructions to cause the processor to:

in response to the second join request being received, send to the client device for storage at the client device an indicator that is associated with the email address of the user;

receive at the meeting server a third join request for a later web-based meeting;

determine if a third join request for a later web-based meeting that is received at the meeting server includes an indicator of the email address for the user, the indicator having been previously sent by the meeting server and stored at the client device, obtain the email address for the user based on the indicator included in the third join request; and determine whether to connect the client device to the later web-based meeting at least in part in response to obtaining the email address.

21. The non-transitory computer readable storage media of claim 17, further comprising instructions to cause the processor to:

present a prompt to the client device for the user to enter an email address prior to admitting the client device to the scheduled web-based meeting.

22. The non-transitory computer readable storage media of claim 17, wherein the instructions cause the processor to obtain from the client device the email address for the user at least in part in response to determining that the first join request does not include an indicator of the email address for the user.

* * * * *